US009668249B2

(12) United States Patent
Oizumi et al.

(10) Patent No.: US 9,668,249 B2
(45) Date of Patent: *May 30, 2017

(54) TERMINAL DEVICE, BASE STATION DEVICE, TRANSMITTING METHOD AND RECEIVING METHOD

(71) Applicant: Sun Patent Trust, New York, NY (US)

(72) Inventors: Toru Oizumi, Kanagawa (JP); Akihiko Nishio, Osaka (JP); Ayako Horiuchi, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/263,215

(22) Filed: Sep. 12, 2016

(65) Prior Publication Data
US 2016/0381677 A1    Dec. 29, 2016

Related U.S. Application Data

(63) Continuation of application No. 15/042,028, filed on Feb. 11, 2016, now Pat. No. 9,467,987, which is a (Continued)

(30) Foreign Application Priority Data

Jan. 5, 2011    (JP) .................................. 2011-000744
Oct. 24, 2011   (JP) .................................. 2011-233007

(51) Int. Cl.
H04W 4/00      (2009.01)
H04B 7/00      (2006.01)
(Continued)

(52) U.S. Cl.
CPC ........... H04W 72/0413 (2013.01); H04L 1/00 (2013.01); H04L 1/1692 (2013.01);
(Continued)

(58) Field of Classification Search
CPC ... H04W 28/04; H04W 52/146; H04W 72/04; H04W 72/0413; H04W 72/1268
(Continued)

(56) References Cited

U.S. PATENT DOCUMENTS 9,113,458 B2    8/2015   Lee et al.
2010/0202389 A1 8/2010   Cai et al.
(Continued)

FOREIGN PATENT DOCUMENTS

CN    101809897 A    8/2010
CN    101835271 A    9/2010
(Continued)

OTHER PUBLICATIONS

3GPP TS 36.211 V9.1.0, "3rd Generation Partnership Project; Technical Specification Group Radio Access Network; Evolved Universal Terrestrial Radio Access (E-UTRA); Physical Channels and Modulation (Release 9)," Mar. 2010, 85 pages.
(Continued)

Primary Examiner — Man Phan
Assistant Examiner — Ryan Kavleski
(74) Attorney, Agent, or Firm — Seed IP Law Group LLP

(57) ABSTRACT

The present invention pertains to a terminal device, which, when ARQ is used for communication that uses an uplink unit band and a plurality of downlink unit bands associated with the uplink unit band, and when a transmission mode that supports up to 2 TB in a PCell is set in the terminal, is capable of reducing the amount of signaling from a base station while eliminating a lack of PUCCH resources when semi-permanent scheduling (SPS) is used in the PCell. A control unit in this device selects one value among values obtained by adding 1 to four PUCCH resource indexes, which have been preset for PUCCH resource 1 by the base station, on the basis of values for transmission power control
(Continued)

information (TPC command for PUCCH) in a PDCCH, for which notification has been received at the start of SPS.

11 Claims, 18 Drawing Sheets

Related U.S. Application Data continuation of application No. 14/729,922, filed on Jun. 3, 2015, now Pat. No. 9,295,054, which is a continuation of application No. 14/500,792, filed on Sep. 29, 2014, now Pat. No. 9,077,533, which is a continuation of application No. 13/990,395, filed as application No. PCT/JP2011/007106 on Dec. 20, 2011, now Pat. No. 8,879,497.

(51) Int. Cl.
| | |
|---|---|
| *H04W 72/04* | (2009.01) |
| *H04W 72/02* | (2009.01) |
| *H04W 72/12* | (2009.01) |
| *H04W 52/54* | (2009.01) |
| *H04L 1/16* | (2006.01) |
| *H04L 1/18* | (2006.01) |
| *H04L 1/00* | (2006.01) |
| *H04L 5/00* | (2006.01) |
| *H04W 76/04* | (2009.01) |
| *H04W 28/06* | (2009.01) |
| *H04W 88/02* | (2009.01) |
| *H04W 88/08* | (2009.01) |

(52) U.S. Cl.
CPC .......... *H04L 1/1854* (2013.01); *H04L 1/1861* (2013.01); *H04L 5/0055* (2013.01); *H04W 52/54* (2013.01); *H04W 72/02* (2013.01); *H04W 72/042* (2013.01); *H04W 72/0453* (2013.01); *H04W 72/12* (2013.01); *H04W 76/048* (2013.01); *H04W 28/06* (2013.01); *H04W 88/02* (2013.01); *H04W 88/08* (2013.01)

(58) Field of Classification Search
USPC .................. 370/252, 329, 336; 455/511, 522
See application file for complete search history.

(56) References Cited

U.S. PATENT DOCUMENTS

| | | |
|---|---|---|
| 2010/0291937 A1 | 11/2010 | Hu et al. |
| 2011/0250918 A1 | 10/2011 | Jen |
| 2012/0106407 A1 | 5/2012 | Papasakellariou et al. |
| 2012/0294272 A1 | 11/2012 | Han et al. |
| 2012/0320805 A1 | 12/2012 | Yang et al. |
| 2013/0201841 A1 | 8/2013 | Zhang et al. |
| 2013/0223300 A1 | 8/2013 | Yang et al. |
| 2013/0223301 A1 | 8/2013 | Lee et al. |
| 2013/0230033 A1 | 9/2013 | Lee et al. |
| 2013/0279441 A1 | 10/2013 | Lee et al. |
| 2014/0071864 A1 | 3/2014 | Seo et al. |
| 2014/0204887 A1 | 7/2014 | Chung et al. |

FOREIGN PATENT DOCUMENTS

| | | |
|---|---|---|
| WO | 2009/055536 A2 | 4/2009 |
| WO | 2012/064153 A2 | 5/2012 |

OTHER PUBLICATIONS

3GPP TS 36.212 V9.2.0, "3rd Generation Partnership Project; Technical Specification Group Radio Access Network; Evolved Universal Terrestrial Radio Access (E-UTRA); Multiplexing and channel coding (Release 9)," Jun. 2010, 61 pages.
3GPP TS 36.213 V9.2.0, "3rd Generation Partnership Project; Technical Specification Group Radio Access Network; Evolved Universal Terrestrial Radio Access (E-UTRA); Physical layer procedures (Release 9)," Jun. 2010, 80 pages.
3GPP TS 36.213 V10.0.1, "3rd Generation Partnership Project; Technical Specification Group Radio Access Network; Evolved Universal Terrestrial Radio Access (E-UTRA); Physical layer procedures (Release 10)," Dec. 2010, 98 pages.
CATT, CATR, CMCC, "Way forward on TDD ACK/NAK in Rel-10," R1-106495, TSG-RAN WG1 Meeting #63, Jacksonville, USA, Nov. 15-19, 2010, 5 pages.
Ericsson, ST-Ericsson, "A/N transmission in the uplink for carrier aggregation," R1-100909, 3GPP TSG-RAN WG1 #60, Agenda item: 7.1.6, San Francisco, USA, Feb. 22-26, 2010, 4 pages.
Huawei, "UL ACK/NACK feedback related DCI design for carrier aggregation," R1-101943, 3GPP TSG RAN WG1 Meeting #60bis, Agenda Item: 6.2.4.1, Beijing, China, Apr. 12-16, 2010, 4 pages.
International Search Report dated Feb. 7, 2012, for corresponding International Application No. PCT/JP2011/007106, 2 pages.
Nakao et al., "Performance enhancement of E-UTRA uplink control channel in fast fading environments," IEEE 69th Vehicular Technology Conference, VTC Spring 2009, Apr. 26-29, 2009, 5 pages.
NTT DoCoMo, "Remaining issue for Channel Selection," R1-106175, 3GPP TSG RAN WG1 Meeting #63, Agenda Item: 6.2.1.1, Jacksonville, USA, Nov. 15-19, 2010, pp. 1-6.
Panasonic, "UL ACK/NACK transmission on PUCCH for carrier aggregation," R1-091744, 3GPP TSG-RAN WG1 Meeting #57, Agenda Item: 15.4, San Francisco, USA, May 4-8, 2009, 3 pages.
Samsung, CATT, ETRI, Panasonic, Ericsson, ST-Ericsson, LG-Ericsson, LGE, InterDigital, MediaTek, Huawei, NTT DoCoMo, Potevio, Alcatel-Lucent, Alcatel-Lucent Shanghai Bell, RIM, Sharp, "Way Forward on PUCCH Resource Allocation," R1-105040, 3GPP TSG RAN WG1 Meeting #62, Agenda item: 6.2.2.3, Madrid, Spain, Aug. 23-27, 2010, 2 pages.
ZTE, "Uplink Control Channel Design for LTE-Advanced," R1-091702, TSG-RAN WG1 #57, Agenda Item: 15.4, San Francisco, USA, May 4-8, 2009, pp. 1-6.
English Translation of Chinese Search Report dated Aug. 5, 2015, for corresponding CN Application No. 2011800626467, 2 pages.
English Translation of Russian Office Action dated Jul. 9, 2015, for corresponding RU Application 2013130668/07(045816), 6 pages.

FIRST RESOURCE REPORTING METHOD FOR SPS (SAME METHOD AS LTE)

| VALUE OF TPC COMMAND FOR PUCCH | PUCCH resource index $n_{PUCCH}^{(1)}$ |
|---|---|
| '00' | FIRST PUCCH RESOURCE INDEX SET IN ADVANCE BY BASE STATION |
| '01' | SECOND PUCCH RESOURCE INDEX SET IN ADVANCE BY BASE STATION |
| '10' | THIRD PUCCH RESOURCE INDEX SET IN ADVANCE BY BASE STATION |
| '11' | FOURTH PUCCH RESOURCE INDEX SET IN ADVANCE BY BASE STATION |

SECOND RESOURCE REPORTING METHOD FOR SPS

| VALUE OF TPC COMMAND FOR PUCCH | PUCCH resource index $n_{PUCCH}^{(1)'}$ |
|---|---|
| '00' | FIFTH PUCCH RESOURCE INDEX SET IN ADVANCE BY BASE STATION |
| '01' | SIXTH PUCCH RESOURCE INDEX SET IN ADVANCE BY BASE STATION |
| '10' | SEVENTH PUCCH RESOURCE INDEX SET IN ADVANCE BY BASE STATION |
| '11' | EIGHTH PUCCH RESOURCE INDEX SET IN ADVANCE BY BASE STATION |

FIG. 9

| VALUE OF TPC COMMAND FOR PUCCH | PUCCH resource index $n_{PUCCH}^{(1)}$ |
|---|---|
| '00' | FIRST PUCCH RESOURCE INDEX SET IN ADVANCE BY BASE STATION |
| '01' | SECOND PUCCH RESOURCE INDEX SET IN ADVANCE BY BASE STATION |
| '10' | THIRD PUCCH RESOURCE INDEX SET IN ADVANCE BY BASE STATION |
| '11' | FOURTH PUCCH RESOURCE INDEX SET IN ADVANCE BY BASE STATION |

FIG. 17

| VALUE OF TPC COMMAND FOR PUCCH | PUCCH resource index $n^{(1)}_{pucch}+1$ |
|---|---|
| '00' | VALUE OBTAINED BY ADDING 1 TO FIRST PUCCH RESOURCE INDEX SET IN ADVANCE BY BASE STATION |
| '01' | VALUE OBTAINED BY ADDING 1 TO SECOND PUCCH RESOURCE INDEX SET IN ADVANCE BY BASE STATION |
| '10' | VALUE OBTAINED BY ADDING 1 TO THIRD PUCCH RESOURCE INDEX SET IN ADVANCE BY BASE STATION |
| '11' | VALUE OBTAINED BY ADDING 1 TO FOURTH PUCCH RESOURCE INDEX SET IN ADVANCE BY BASE STATION |

FIG. 18

| VALUE OF TPC COMMAND FOR PUCCH | PUCCH resource index $n^{(1)}_{PUCCH\_mod(x+1,4)}$ |
|---|---|
| '00' | SECOND PUCCH RESOURCE INDEX SET IN ADVANCE BY BASE STATION |
| '01' | THIRD PUCCH RESOURCE INDEX SET IN ADVANCE BY BASE STATION |
| '10' | FOURTH PUCCH RESOURCE INDEX SET IN ADVANCE BY BASE STATION |
| '11' | FIRST PUCCH RESOURCE INDEX SET IN ADVANCE BY BASE STATION |

PUCCH RESOURCE INDEXES OF PUCCH RESOURCE 2
WHEN PUCCH RESOURCE INDEX OF PUCCH RESOURCE 1 FOR TPC COMMAND VALUE x FOR PUCCH
IS EXPRESSED AS $n^{(1)}_{PuCCH,x}$

FIG. 19

TERMINAL DEVICE, BASE STATION DEVICE, TRANSMITTING METHOD AND RECEIVING METHOD

BACKGROUND

Technical Field

The present invention relates to a terminal apparatus, a base station apparatus, a transmitting method, and a receiving method.

Description of the Related Art

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with a base station. Subsequently, the terminal reads BCH information to acquire base station-specific parameters (see, Non-Patent Literatures (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control Channel (PDCCH) as appropriate to the terminal with which a communication link has been established.

The terminal performs "blind-determination" on each of a plurality of pieces of control information included in the received PDCCH signals (i.e., Downlink (DL) Assignment Control Information: also referred to as Downlink Control Information (DCI)). To put it more specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. To put it more specifically, each terminal feeds back response signals indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as response signals. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. The PDCCH includes one or more L1/L2 control channels (L1/L2 CCH). Each L1/L2 CCH consists of one or more Control Channel Elements (CCE). To put it more specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits response signals to the base station using the identified resources. However, when the L1/L2 CCH occupies a plurality of contiguous CCEs, the terminal transmits the response signals to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

Moreover, 3GPP LTE employs a scheduling scheme of assigning radio resources in a constant cycle for packet data in VoIP, streaming, and the like involving a transmission rate that is constant to some extent, instead of employing a best-effort scheduling scheme (dynamic scheduling), which dynamically assigns radio resources to achieve higher efficiency. This scheduling scheme is referred to, for example, persistent scheduling or semi-persistent scheduling (SPS). In SPS, activation and release are indicated through a PDCCH. Once SPS is activated, a base station transmits a Physical Downlink Shared Channel (PDSCH) in a constant cycle and no longer indicates a PDCCH with respect to the PDSCH scheduled by SPS. In SPS, since the base station and a terminal perform transmission and reception at known transmission timing as described above, downlink scheduling information (DL scheduling information) can be reduced, which in turn makes it possible to effectively utilize downlink radio resources. During SPS transmission, the terminal feeds back response signals to the base station. This feedback of the response signals is performed using a PUCCH resource corresponding to one of four PUCCH resource indexes ($n^{(1)}_{PUCCH}$) that are set in advance in a one-to-one correspondence with (two-bit) values of a transmission power control (TPC) command in the PDCCH indicating the activation of SPS.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). To put it more specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). In FIG. 2, however, "subcarriers" in the vertical axis of the drawing are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resources. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communications than 3GPP LTE has started. 3GPP LTE-Advanced systems (may be referred to as "LTE-A system," hereinafter) follow 3GPP LTE systems (may be referred to as "LTE system," hereinafter). 3GPP LTE-Advanced is expected to introduce base stations and terminals capable of communicating with each other using a wideband frequency of 40 MHz or greater to realize a downlink transmission rate up to 1 Gbps or above.

In the LTE-A system, in order to simultaneously achieve backward compatibility with the LTE system and ultra-high-speed communications several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. Moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared Channel (PUSCH) in the vicinity of the center of the bandwidth and PUCCHs for LTE on both ends of the band. In addition, the term "component carrier" may be also referred to as "cell" in English in 3GPP LTE-Advanced and may be abbreviated as CC(s).

The LTE-A system supports communications using a band obtained by aggregating several component carriers, so called "carrier aggregation." In general, throughput requirements for uplink are different from throughput requirements for downlink. For this reason, so called "asymmetric carrier aggregation" has been also discussed in the LTE-A system. In asymmetric carrier aggregation, the number of component carriers configured for any terminal compliant with the LTE-A system (hereinafter, referred to as "LTE-A terminal") differs between uplink and downlink. In addition, the LTE-A system supports a configuration in which the numbers of component carriers are asymmetric between uplink and downlink, and the component carriers have different frequency bandwidths.

FIG. 3 is a diagram provided for describing asymmetric carrier aggregation and a control sequence applied to individual terminals. FIG. 3 illustrates a case where the bandwidths and numbers of component carriers are symmetric between the uplink and downlink of base stations.

In FIG. 3, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communications is set for terminal 2.

Referring to terminal 1, an LTE-A base station and an LTE-A terminal included in the LTE-A system transmit and receive signals to and from each other in accordance with the sequence diagram illustrated in FIG. 3A. As illustrated in FIG. 3A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communications with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers is not increased, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, studies have been carried out on channel selection (also referred to as "multiplexing"), bundling and a discrete Fourier transform spread orthogonal frequency division multiplexing (DFT-S-OFDM) format as a method of transmitting a plurality of response signals for the plurality of pieces of downlink data. In channel selection, not only symbol points used for response signals, but also the resources to which the response signals are mapped are varied in accordance with the pattern for results of the error detection on the plurality of pieces of downlink data. Compared with channel selection, in bundling, ACK or NACK signals generated according to the results of error detection on the plurality of pieces of downlink data are bundled (i.e., bundled by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5).

More specifically, channel selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data received on the plurality of downlink component carriers are each an ACK or NACK as illustrated in FIG. 4. Meanwhile, bundling is a technique that bundles ACK/NACK signals for the plurality of pieces of downlink data into a single set of signals and thereby transmits the bundled signals using one predetermined resource (see, NPLs 6 and 7).

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is allocated in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example. This resource is associated in a one-to-one correspondence with and implicitly assigned to a CCE index, and thus may be referred to as implicit resource.

The other method is to previously indicate a PUCCH resource to each terminal from a base station (i.e., explicit signaling) (hereinafter, method 2). To put it differently, each terminal transmits response signals using the PUCCH resource previously indicated by the base station in method 2. This resource is explicitly indicated in advance by the base station, and thus may be referred to as explicit resource.

In addition, as illustrated in FIG. 4, one of the two downlink component carriers is paired with one uplink component carrier to be used for transmission of response signals. The downlink component carrier paired with the uplink component carrier to be used for transmission of response signals is called a primary component carrier (PCC) or a primary cell (PCell). In addition, the downlink component carrier other than the primary component carrier is called a secondary component carrier (SCC) or a secondary cell (SCell). For example, PCC (or PCell) is the downlink component carrier used to transmit broadcast information about the uplink component carrier on which response signals to be transmitted (e.g., system information block type 2 (SIB 2)).

Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 4) is assigned (implicit signaling).

Next, a description will be provided regarding ARQ control using channel selection when the asymmetric carrier aggregation described above is applied to terminals with reference to FIGS. 4, 5 and 6.

In a case where a component carrier group (may be referred to as "component carrier set" in English) consisting of downlink component carrier 1 (PCell), downlink component carrier 2 (SCell) and uplink component carrier 1 is configured for terminal 1 as illustrated in FIG. 4, after downlink resource assignment information is transmitted via a PDCCH of each of downlink component carriers 1 and 2, downlink data is transmitted using the resource corresponding to the downlink resource assignment information.

In channel selection, when terminal 1 succeeds in receiving the downlink data on component carrier 1 (PCell) but fails to receive the downlink data on component carrier 2 (SCell) (i.e., when the result of error detection on component carrier 1 (PCell) is an ACK and the result of error detection on component carrier 2 (SCell) is a NACK), the response signals are mapped to a PUCCH resource in PUCCH region 1 to be implicitly signaled, while a first phase point (e.g., phase point (1, 0) and/or the like) is used as the phase point of the response signals. In addition, when terminal 1 succeeds in receiving the downlink data on component carrier 1 (PCell) and also succeeds in receiving the downlink data on component carrier 2 (SCell), the response signals are mapped to a PUCCH resource in PUCCH region 2 while the first phase point is used. That is, in the configuration including two downlink component carriers with a transmission mode that supports only one transport block (TB) per downlink component carrier, the results of error detection are represented in four patterns (i.e., ACK/ACK, ACK/NACK, NACK/ACK, and NACK/NACK). Hence, the four patterns can be represented by combinations of two PUCCH resources and two kinds of phase points (e.g., binary phase shift keying (BPSK) mapping).

In addition, when terminal 1 fails to receive DCI on component carrier 1 (PCell) but succeeds in receiving downlink data on component carrier 2 (SCell) (i.e., the result of error detection on component carrier 1 (PCell) is a DTX and the result of error detection on component carrier 2 (SCell) is an ACK), the CCEs occupied by the PDCCH intended for terminal 1 cannot be identified. Thus, the PUCCH resource included in PUCCH region 1 and associated in a one-to-one correspondence with the top CCE index of the CCEs cannot be identified either. Accordingly, in this case, in order to report an ACK, which is the result of error detection on component carrier 2, the response signals need to be mapped to an explicitly signaled PUCCH resource included in PUCCH region 2 (may be referred to as "to support implicit signaling," hereinafter).

To be more specific, FIG. 5 and FIG. 6 each illustrate mapping of patterns for the results of error detection in the configuration including two downlink component carriers (one PCell and one SCell) with:

(a) the transmission mode that supports only 1 TB for each downlink component carrier;

(b) the transmission mode that supports only 1 TB for the downlink component carrier of PCell and the transmission mode that supports up to 2 TBs for the downlink component carrier of SCell;

(c) the transmission mode that supports up to 2 TBs for the downlink component carrier of PCell and the transmission mode that supports only 1 TB for the downlink component carrier of SCell; and (d) the transmission mode that supports up to 2 TBs for each downlink component carrier. FIG. 7 illustrates the mapping of each of FIG. 5 and FIG. 6 in the form of a table (hereinafter, may be referred to as "mapping table" or "transmission rule table").

For downlink data channel (Physical Downlink Shared Channel: PDSCH) transmission in PCell, the PUCCH resource indicating method disclosed in NPL 8 uses an implicit resource when dynamic scheduling is used for PCell. Meanwhile, when SPS is used for PCell, this method uses one of four PUCCH resources set in advance in a one-to-one correspondence with values of a TPC command for PUCCH that is included in the PDCCH indicating the activation of SPS, similarly to 3GPP LTE. For PDSCH transmission in SCell, this method uses an implicit resource when a PDCCH corresponding to a PDSCH in SCell is placed in PCell (hereinafter, may be referred to as "cross-carrier scheduling from PCell to SCell") and uses an explicit resource when no cross-carrier scheduling from PCell to SCell is configured.

In the method disclosed in NPL 8, for PDSCH transmission in SCell when no cross-carrier scheduling from PCell to SCell is configured, a PDCCH corresponding to a PDSCH in SCell is placed in SCell. In such a case, if an implicit resource, which is implicitly indicated on the basis of the CCE index, is used, the CCE index of a PDCCH placed in PCell that is intended for the target terminal or a different terminal may be the same as the CCE of the PDCCH placed in SCell that is intended for the target terminal. In this case, the same PUCCH resource is indicated to both PCell and SCell, and a collision of response signals occurs unfavorably. For this reason, an explicit resource is used for PDSCH transmission in SCell when no cross-carrier scheduling from PCell to SCell is configured. On the other hand, for PDSCH transmission in SCell when cross-carrier scheduling from PCell to SCell is configured, the PDCCH corresponding to the PDSCH in SCell is placed in PCell. In this case, there is no such case where a CCE occupied by a different PDCCH intended for the same terminal or by a PDCCH intended for another terminal is used for the CCE occupied by the abovementioned PDCCH. Hence, an implicit resource can be used for the PDSCH transmission in SCell when cross-carrier scheduling from PCell to SCell is configured.

The PUCCH resource indicating method disclosed in NPL 9 uses one implicit resource for non-MIMO DCI and two implicit resources for MIMO DCI for PDSCH transmission in PCell. This method uses an explicit resource for PDSCH transmission in SCell.

In the case of NPL 9, 1 CCE includes 36 resource elements (REs), and 72 bits can be thus transmitted per CCE when QPSK mapping for each resource element is used. Non-MIMO DCI has a smaller number of bits than MIMO DCI, and thus can be transmitted using 1 CCE. In contrast, MIMO DCI has a larger number of bits than non-MIMO DCI, and is generally transmitted using 2 or more CCEs in order to reduce the error rate of PDCCH. Accordingly, in the case of NPL 9, one implicit resource is used for non-MIMO DCI in consideration of PDCCH transmission using 1 or more CCEs, whereas two implicit resources are used for MIMO DCI in consideration of PDCCH transmission using 2 or more CCEs.

If two implicit resources are used for PDCCH transmission using 1 CCE, because the implicit resources are associated in a one-to-one correspondence with the CCE indexes, 2 CCEs need to be occupied for the PUCCH resource indication although the PDCCH transmission occupies only 1 CCE. In such a case where a larger number of CCEs than the number of CCEs occupied by PDCCH are occupied for the PUCCH resource indication, a PDCCH for another terminal cannot be assigned to these CCEs, which results in restrictions on PDCCH scheduling in the base station.

CITATION LIST

Non-Patent Literature

NPL 1
3GPP TS 36.211 V9.1.0, "Physical Channels and Modulation (Release 9)," May 2010
NPL 2
3GPP TS 36.212 V9.2.0, "Multiplexing and channel coding (Release 9)," June 2010
NPL 3
3GPP TS 36.213 V9.2.0, "Physical layer procedures (Release 9)," June 2010
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April 2009
NPL 5
Ericsson and ST-Ericsson, "A/N transmission in the uplink for carrier aggregation," R1-100909, 3GPP TSG-RAN WG1 #60, February 2010
NPL 6
ZTE, 3GPP RAN1 meeting #57, R1-091702, "Uplink Control Channel Design for LTE-Advanced," May 2009

NPL 7
Panasonic, 3GPP RAN1 meeting #57, R1-091744, "UL ACK/NACK transmission on PUCCH for Carrier aggregation," May 2009

NPL 8
Samsung, CATT, ETRI, Panasonic, Ericsson, ST-Ericsson, LG-Ericsson, LG Electronics, InterDigital, MediaTek, Huawei, NTT DOCOMO, Potevio, Alcatel-Lucent, Alcatel-Lucent Shanghai Bell, RIM, and Sharp, 3GPP RAN1 meeting #62, R1-105040, "Way Forward on PUCCH Resource Allocation," August 2010

NPL 9
CATT, CATR, and CMCC, 3GPP RAN1 meeting #63, R1-106495, "Way forward on TDD ACK/NAK in Rel-10," November 2010

NPL 10
NTT DOCOMO, 3GPP RAN1 meeting #63, R1-106175, "Remaining Issue for Channel Selection," November 2010

BRIEF SUMMARY

Technical Problem

In the case where the number of CCs configured (semi-statically configured) in the terminal is 2, the number of ACK/NACK bits that the terminal reports to the base station is determined on the basis of the number of code words (CWs) set in advance in the terminal, i.e., on the basis of the transmission mode, to be more precise, instead of the number of actually transmitted CWs. That is, a mapping table is selected on the basis of the set transmission mode. For example, when the terminal is configured with 2 CCs and a transmission mode that supports up to 2 TBs (transmission mode 3, 4, or 8) for PCell and a transmission mode that supports only 1 TB (transmission mode 1, 2, 5, 6, or 7) for SCell, the terminal reports response signals to the base station using a three-bit mapping table, regardless of the number of actually transmitted (dynamic) TBs.

Let us suppose a situation where SPS transmission is performed on PCell when a terminal is configured with 2 CCs and a transmission mode that supports up to 2 TBs (transmission mode 3, 4, or 8) for PCell and a transmission mode that supports only 1 TB (transmission mode 1, 2, 5, 6, or 7) for SCell. According to the methods disclosed in NPL 8 and NPL 9, two PUCCH resources in total are indicated, the resources including one PUCCH resource for SPS in PCell and one PUCCH resource (implicit resource when cross-carrier scheduling from PCell to SCell is configured or an explicit resource when no cross-carrier scheduling from PCell to SCell is configured) in SCell.

As illustrated in FIG. 8, however, three PUCCH resources are required in the above-described situation, where SPS transmission is performed on PCell when the terminal is configured with 2 CCs and the transmission mode that supports up to 2 TBs (transmission mode 3, 4, or 8) for PCell and the transmission mode that supports only 1 TB (transmission mode 1, 2, 5, 6, or 7) for SCell, on the assumption that response signals (that is, "A, N/D, A", "N/D, N/D, A", "A, N/D, N/D", and "N/D, N/D, N/D") in portions other than the shaded portions, in which PDSCH (CW1) in PCell is always NACK or DTX, are reported to the base station. That is, one PUCCH resource is lacking.

As disclosed in NPL 8, there is a method using an implicit resource associated in a one-to-one correspondence with the top CCE index of the CCEs occupied by a PDCCH indicating a PDSCH in PCell. However, since there is no PDCCH intended for the target terminal and indicating a PDSCH scheduled by SPS in PCell, the implicit resource cannot be used.

Such a method as illustrated in FIG. 9, which is obtained by expanding 3GPP LTE, may be used. This method uses a PUCCH resource corresponding to one of four PUCCH resource indexes ($n^{(1)}_{PUCCH}$) (first to fourth PUCCH resource indexes) that are set in advance in a one-to-one correspondence with (two-bit) values of a PUCCH transmission power control (TPC) command included in the PDCCH indicating the activation of SPS; and further uses a PUCCH resource corresponding to one of four PUCCH resource indexes ($n^{(1)}_{PUCCH}{}'$ ($n^{(1)}_{PUCCH}{}' \neq n^{(1)}_{PUCCH}$)) (fifth to eighth PUCCH resource indexes), independently of the above. However, according to this method, the amount of signaling from the base station doubles from four PUCCH resources to eight PUCCH resources. More specifically, a condition for the first to fourth PUCCH resource indexes to be used in the terminal is "during SPS," whereas a condition for the fifth to eighth PUCCH resource indexes to be used in the terminal is "during SPS and when a transmission mode that supports up to 2 TBs is set for PCell," that is, these conditions are different. Accordingly, there arises a problem in that the amount of signaling needs to be increased for the latter condition, "during SPS and when a transmission mode that supports up to 2 TBs is set for PCell," which occurs less frequently.

There is a similar problem when the terminal is configured with 2 CCs and a transmission mode that supports up to 2 TBs (transmission mode 3, 4, or 8) for each of PCell and SCell. When SPS transmission is performed on PCell, three PUCCH resources in total are indicated according to the methods disclosed in NPL 8 and NPL 9. The three PUCCH resources are one PUCCH resource for SPS in PCell and two PUCCH resources (implicit resources when cross-carrier scheduling is configured from PCell to SCell or explicit resources when no cross-carrier scheduling from PCell to SCell is configured) in SCell.

As disclosed in NPL 10, let us assume that, when 1 CW (1 TB) transmission is performed on PCell, response signals representing that PDSCH (CW0) and PDSCH (CW1) in PCell are "ACK, NACK" or "NACK, ACK" are not used but response signals representing that PDSCH (CW0) and PDSCH (CW1) in PCell are "ACK, ACK" or "NACK, NACK" are used. Under this assumption, as illustrated in FIG. 10, four PUCCH resources are required when SPS transmission (1 TB transmission) is performed on PCell in a case where the terminal is configured with 2 CCs and a transmission mode that supports up to 2 TBs (transmission mode 3, 4, or 8) for each of PCell and SCell. That is, one PUCCH resource is lacking.

In view of the above-mentioned problems, it is an object of the present invention to provide a PUCCH resource indicating method capable of reducing the amount of signaling from a base station and resolving a lack of PUCCH resources in PCell during semi-persistent scheduling when a terminal is configured with 2 CCs and a transmission mode that supports up to 2 TBs (transmission mode 3, 4, or 8) for at least PCell.

It is an object of the present invention to provide a terminal apparatus, a base station apparatus, a transmitting method, and a receiving method each capable of reducing the amount of signaling from a base station and also resolving a lack of PUCCH resources during semi-persistent scheduling in PCell when a terminal is configured with a transmission mode that supports up to 2 TBs for PCell, while ARQ is applied to communications using an uplink component carrier and a plurality of downlink component carriers associated with the uplink component carrier.

Solution to Problem

A terminal apparatus according to one aspect of the present invention communicates with a base station using a component carrier group including two downlink component carriers and at least one uplink component carrier, and is configured with a transmission mode that supports up to two TBs for data assigned to at least PCell. The terminal apparatus includes: a control information receiving section that receives downlink assignment control information transmitted through a downlink control channel of at least one of the downlink component carriers in the component carrier group; a downlink data receiving section that receives downlink data transmitted through a downlink data channel indicated by the downlink assignment control information; an error detecting section that detects a reception error in the downlink data; a first response controlling section that transmits a response signal through an uplink control channel of the uplink component carrier, on a basis of a result of error detection obtained by the error detecting section and a transmission rule table for the response signal; and a second response controlling section that selects, during semi-persistent scheduling, a first uplink control channel from among the uplink control channels, on a basis of a first uplink control channel index associated in a one-to-one correspondence with first transmission power control information included in downlink assignment control information indicating activate of semi-persistent scheduling. The second response controlling section selects a second uplink control channel on a basis of the first uplink control channel.

A base station apparatus according to one aspect of the present invention communicates with a terminal apparatus using a component carrier group including two downlink component carriers and at least one uplink component carrier. The base station apparatus includes: a control information transmitting section that transmits downlink assignment control information through a downlink control channel of at least one downlink component carrier in the component carrier group, to the terminal apparatus configured with a transmission mode that supports up to 2 TBs for data assigned to at least PCell; a downlink data transmitting section that transmits downlink data through a downlink data channel indicated by the downlink assignment control information to the terminal apparatus; a first response receiving section that receives a response signal transmitted from the terminal apparatus through an uplink control channel of the uplink component carrier; and a second response receiving section that selects, during semi-persistent scheduling, a first uplink control channel from among the uplink control channels on a basis of a first uplink control channel index associated in a one-to-one correspondence with first transmission power control information included in downlink assignment control information indicating activation of semi-persistent scheduling. The second response receiving section selects a second uplink control channel on a basis of the first uplink control channel.

A transmitting method according to one aspect of the present invention includes: performing communications using a component carrier group including two downlink component carriers and at least one uplink component carrier; and setting a transmission mode that supports up to 2 TBs for data assigned to at least PCell. The transmitting method includes: a control information receiving step of receiving downlink assignment control information transmitted through a downlink control channel of at least one of the downlink component carriers in the component carrier group; a downlink data receiving step of receiving downlink data transmitted through a downlink data channel indicated by the downlink assignment control information; an error detecting step of detecting a reception error in the downlink data; a first response controlling step of transmitting a response signal through an uplink control channel of the uplink component carrier, on a basis of a result of error detection obtained in the error detecting step and a transmission rule table for the response signal; and a second response controlling step of selecting, during semi-persistent scheduling, a first uplink control channel from among the uplink control channels on a basis of a first uplink control channel index associated in a one-to-one correspondence with first transmission power control information included in downlink assignment control information indicating activation of semi-persistent scheduling. The second response controlling step includes selecting a second uplink control channel on a basis of the first uplink control channel.

A receiving method according to one aspect of the present invention includes: performing communications using a component carrier group including two downlink component carriers and at least one uplink component carrier; and setting a transmission mode that supports up to 2 TBs for data assigned to at least PCell. The receiving method includes: a control information transmitting step of transmitting downlink assignment control information through a downlink control channel of at least one of the downlink component carriers in the component carrier group; a downlink data transmitting step of transmitting downlink data through a downlink data channel indicated by the downlink assignment control information; a first response receiving step of receiving a response signal transmitted from a terminal apparatus through an uplink control channel of the uplink component carrier; and a second response receiving step of selecting, during semi-persistent scheduling, a first uplink control channel from among the uplink control channels on a basis of a first uplink control channel index associated in a one-to-one correspondence with first transmission power control information included in downlink assignment control information indicating activation of semi-persistent scheduling. The second response receiving step includes selecting a second uplink control channel on a basis of the first uplink control channel.

Advantageous Effects of Invention

According to the present invention, the amount of signaling from a base station can be reduced while a lack of PUCCH resources can be resolved during semi-persistent scheduling in PCell when a terminal is configured with the transmission mode that supports up to 2 TBs for PCell, while ARQ is applied to communications using an uplink component carrier and a plurality of downlink component carriers associated with the uplink component carrier.

BRIEF DESCRIPTION OF THE SEVERAL VIEWS OF THE DRAWINGS

Figure 7:
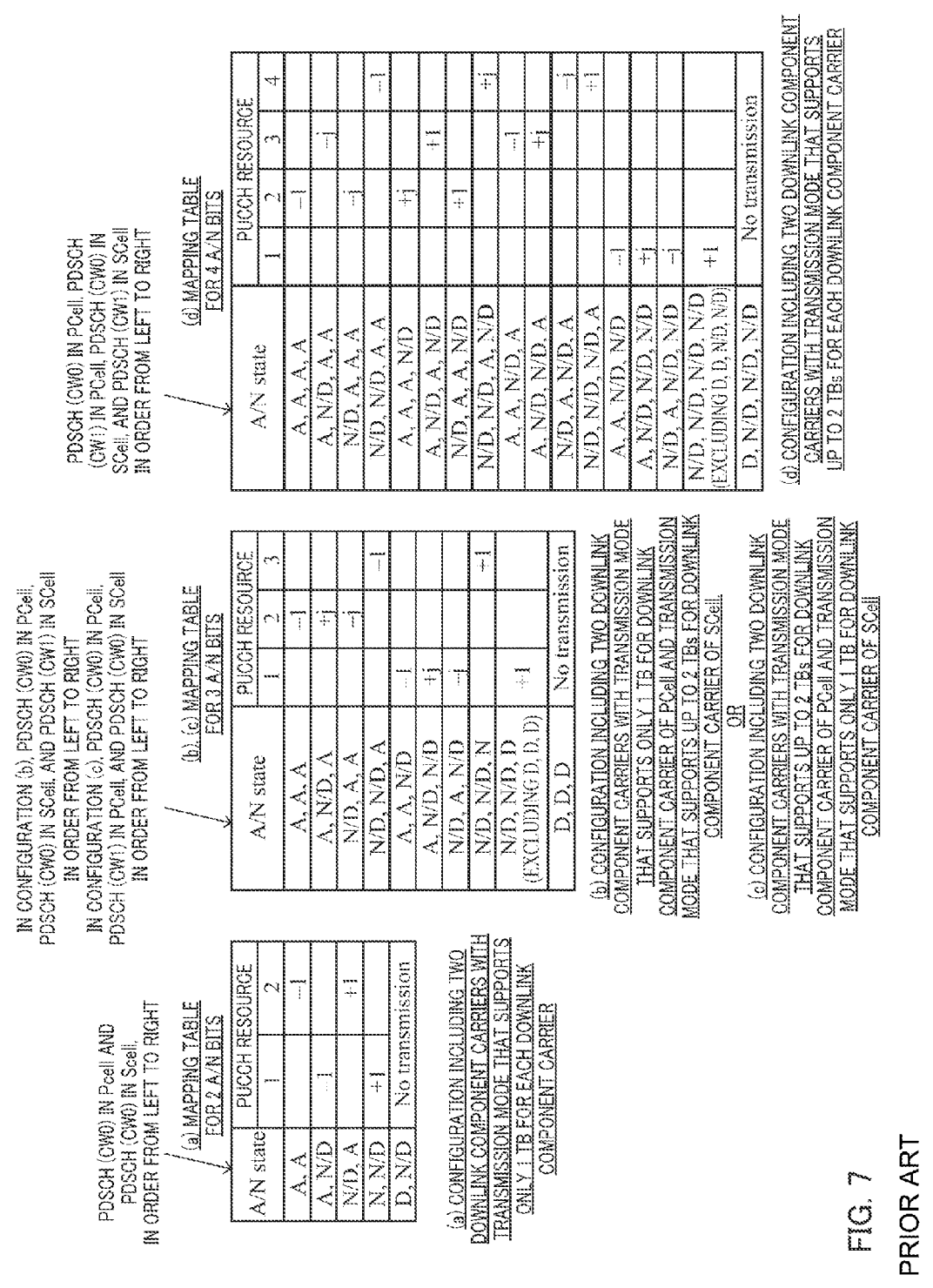

FIG. 7 illustrates an ACK/NACK mapping table;

FIG. 8 is provided for describing a PUCCH resource indicating method (diagram 1);

FIG. 9 is provided for describing a PUCCH resource indicating method for SPS that can be conceived of by a person skilled in the art;

FIG. 17 illustrates a first PUCCH resource indicating method for SPS according to the embodiment of the present invention;

FIG. 18 illustrates a second PUCCH resource indicating method for SPS according to the embodiment of the present invention (method 1); and FIG. 19 illustrates a second PUCCH resource indicating method for SPS according to the embodiment of the present invention (method 2).

DETAILED DESCRIPTION

Figure 1:
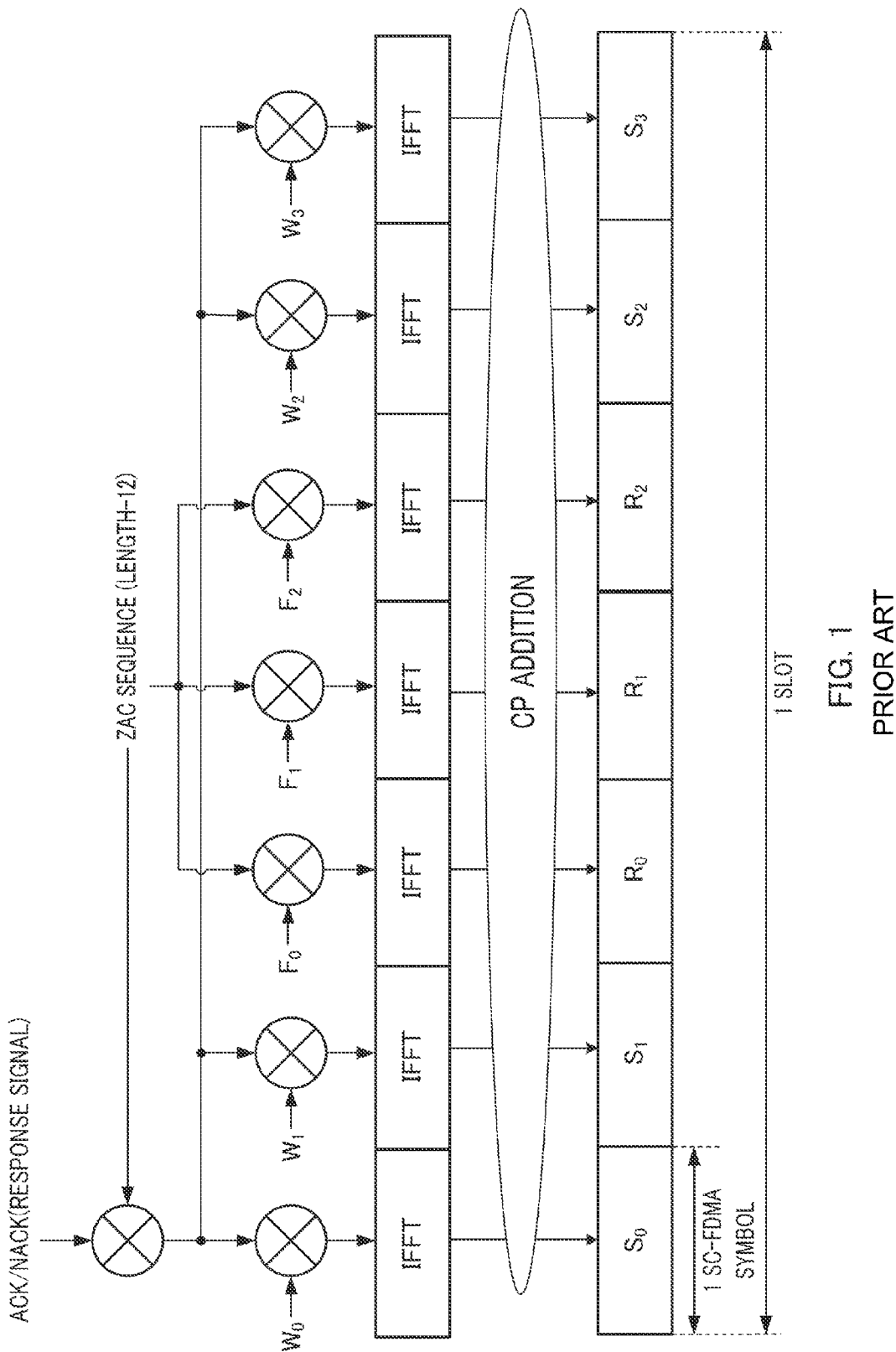
FIG. 1 is a diagram illustrating a method of spreading response signals and reference signals.
Figure 2:
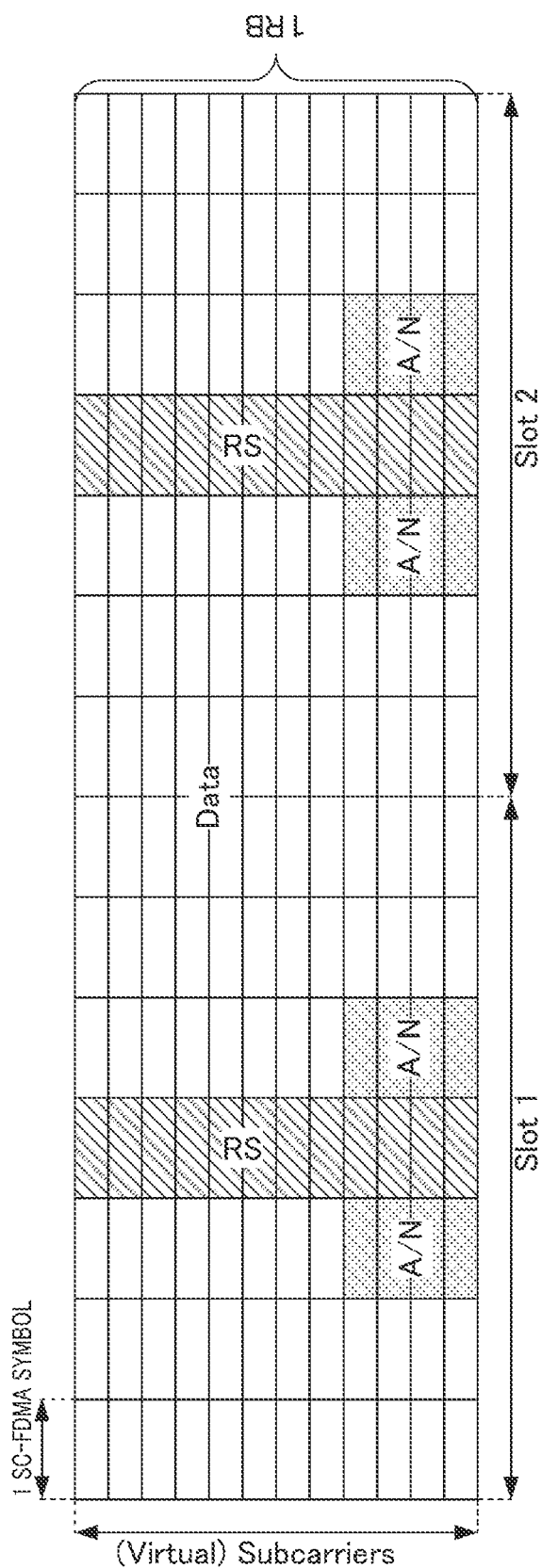
FIG. 2 is a diagram illustrating an operation related to a case where TDM is applied to response signals and uplink data on PUSCH resources.
Figure 3B:
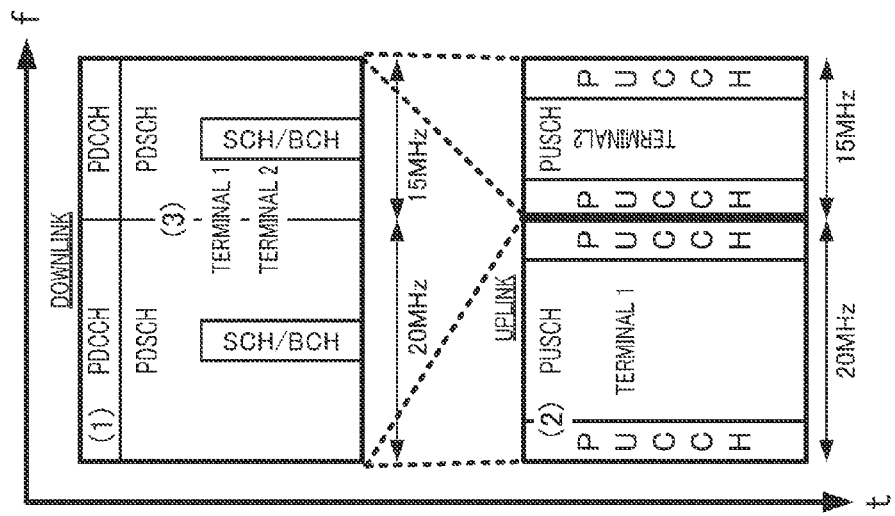
FIGS. 3A-3B are diagrams provided for describing asymmetric carrier aggregation and a control sequence applied to individual terminals.
Figure 3A:
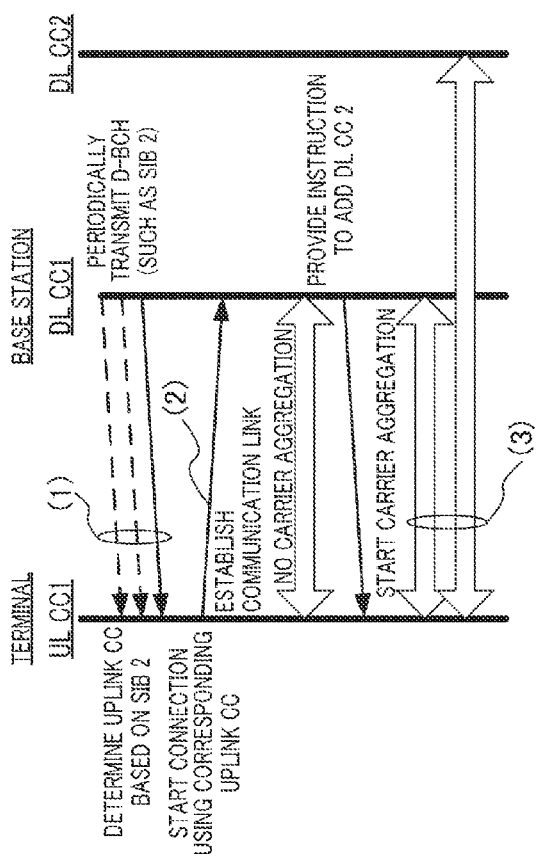
Figure 4:
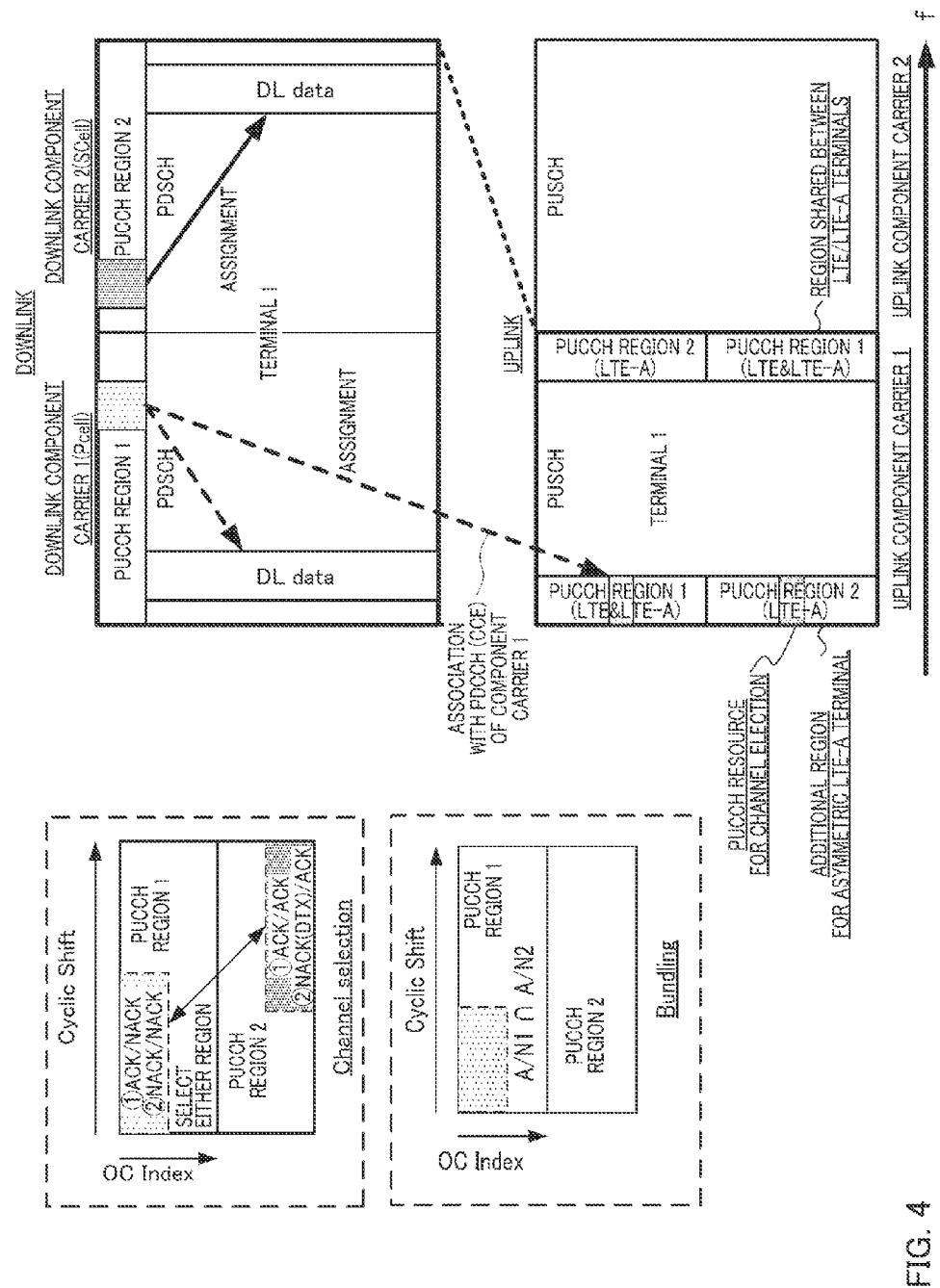
FIG. 4 is a diagram provided for describing asymmetric carrier aggregation and a control sequence applied to individual terminals.
Figure 5:
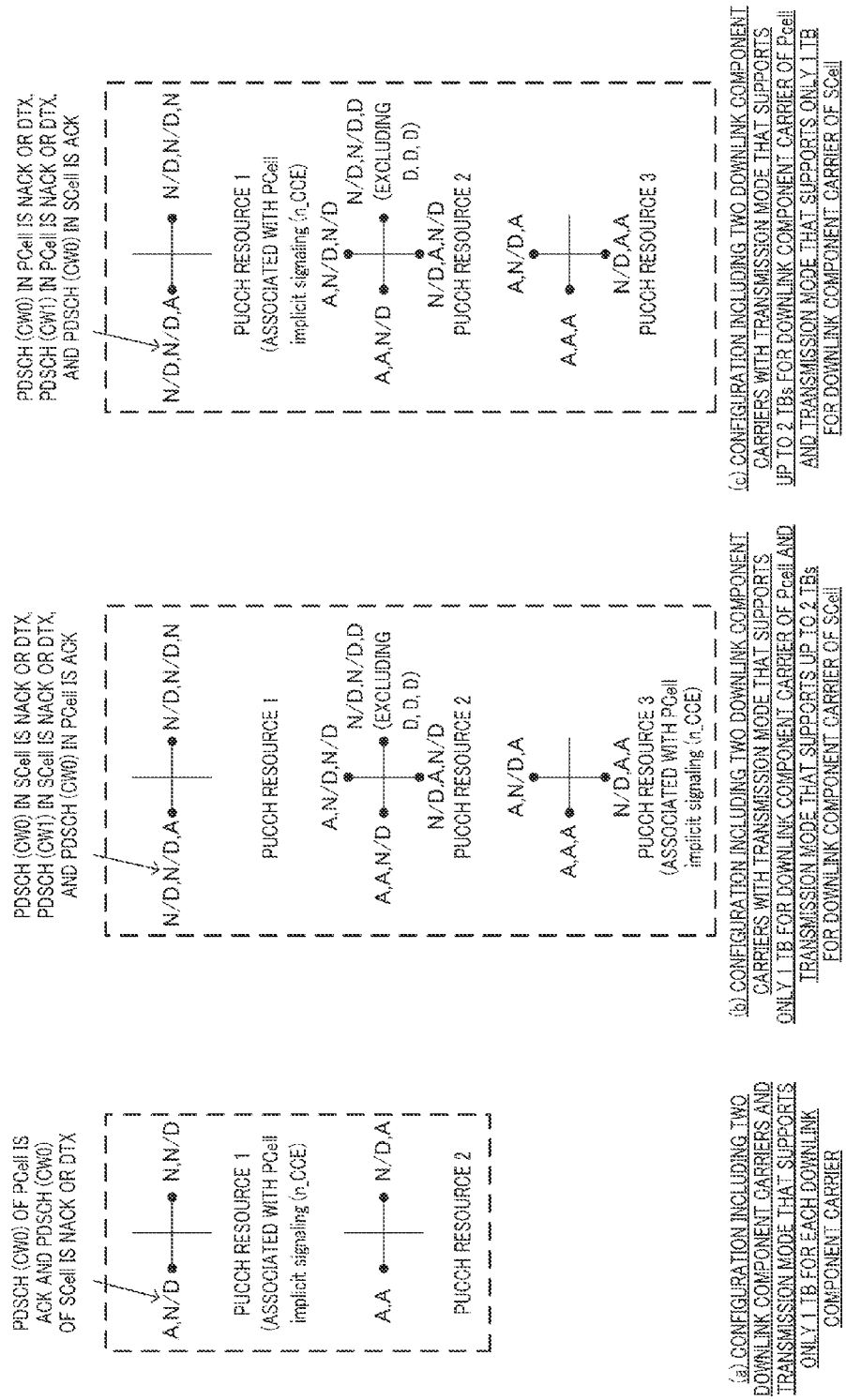
FIG. 5 is diagram 1 provided for describing examples of ACK/NACK mapping (Example 1)
Figure 6:
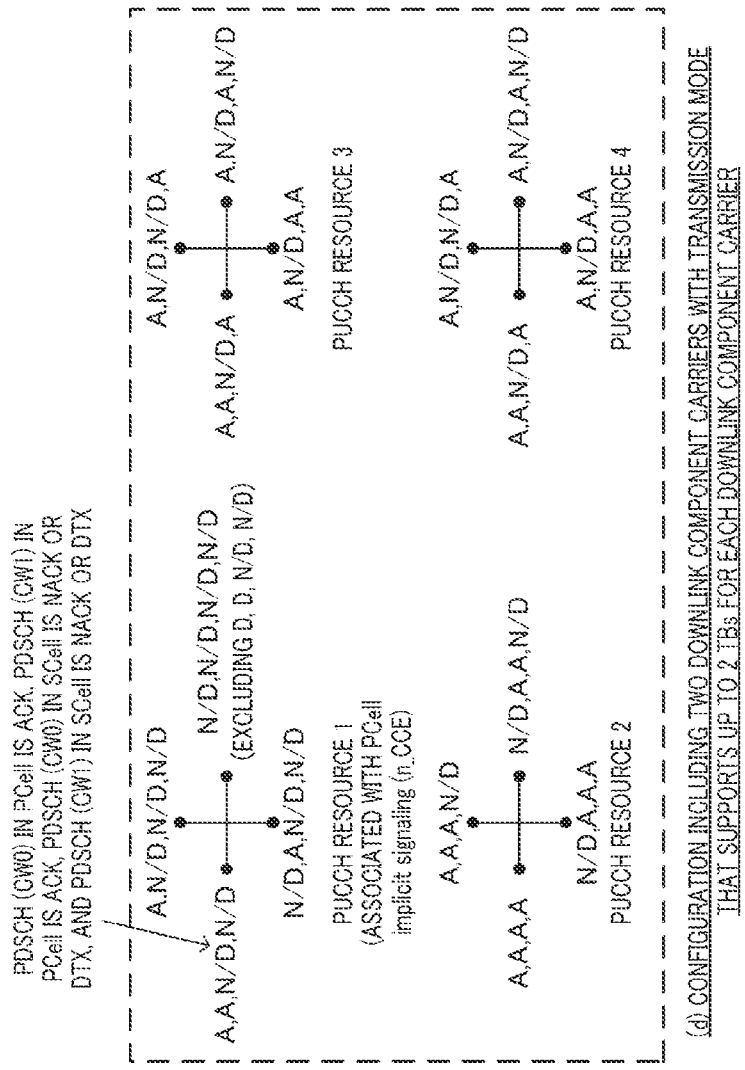
FIG. 6 is diagram 2 provided for describing examples of ACK/NACK mapping (Example 2)

Hereinafter, embodiments of the present invention will be described in detail with reference to the accompanying drawings. Throughout the embodiments, the same elements are assigned the same reference numerals and any duplicate description of the elements is omitted.

Embodiment 1

Figure 11:
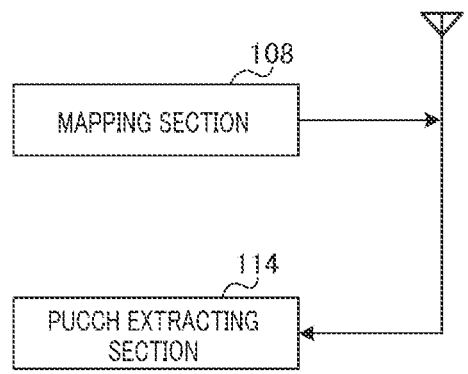
FIG. 11 is a block diagram illustrating a main configuration of a base station according to an embodiment of the present invention.

FIG. 11 is a main configuration diagram of base station 100 according to the present embodiment. Base station 100 communicates with terminal 200 using a component carrier group including two downlink component carriers and at least one uplink component carrier. In base station 100, mapping section 108 maps, for terminal 200 configured with the transmission mode that supports up to 2 transport blocks for data assigned to at least a first downlink component carrier (PCell) of the two downlink component carriers, downlink assignment control information (DCI) to a downlink control channel (PDCCH) of at least one downlink component carrier in the component carrier group, and also maps downlink data to a downlink data channel (PDSCH) indicated by the downlink assignment control information. As a result, the downlink assignment control information is transmitted through the downlink control channel (PDCCH), and the downlink data is transmitted through the downlink data channel (PDSCH). Further, PUCCH extracting section 114 receives a response signal corresponding to the downlink data through an uplink control channel (PUCCH) of the uplink component carrier. During SPS, PUCCH extracting section 114 selects a first uplink control channel resource corresponding to a first index of indexes (PUCCH resource indexes) indicating uplink control channel resources (PUCCH resources) included in the uplink control channel (PUCCH), and selects a second uplink control channel resource on the basis of the first uplink control channel resource.

Figure 12:
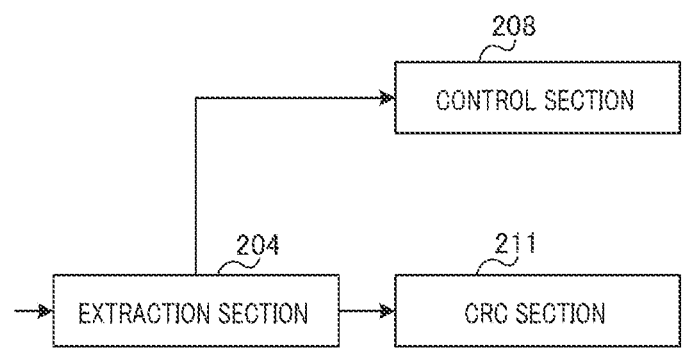
FIG. 12 is a block diagram illustrating a main configuration of a terminal according to the embodiment of the present invention.

FIG. 12 is a main configuration diagram of terminal 200 according to the present embodiment. Terminal 200 communicates with base station 100 using a component carrier group including two downlink component carriers and at least one uplink component carrier. Terminal 200 is configured with the transmission mode that supports up to 2 transport blocks for data assigned to at least a first downlink component carrier (PCell) of the two downlink component carriers. In terminal 200, extraction section 204 receives downlink assignment control information (DCI) transmitted through a downlink control channel (PDCCH) of at least one downlink component carrier in the component carrier group, and receives downlink data transmitted through a downlink data channel (PDSCH) indicated by the downlink assignment control information. CRC section 211 detects a reception error of the downlink data. Control section 208 transmits a response signal corresponding to the downlink data through an uplink control channel (PUCCH) of the uplink component carrier, on the basis of the result of error detection obtained by CRC section 211 and a transmission rule table for the response signal. During semi-persistent scheduling (SPS), control section 208 selects a first uplink control channel resource corresponding to a first index of indexes (PUCCH resource indexes) indicating uplink control channel resources (PUCCH resources) included in the uplink control channel, and selects a second uplink control channel resource on the basis of the selected first uplink control channel resource.

Resources for transmission of response signals including the first uplink control channel resource and the second uplink control channel resource are set in the transmission rule table for terminal 200 configured with the first downlink component carrier. Furthermore, the first index is defined as a PUCCH resource index that is associated in a one-to-one correspondence with first transmission power control information (TPC command for PUCCH) included in the downlink assignment control indicating the activation of SPS.

(Configuration of Base Station)

Figure 13:
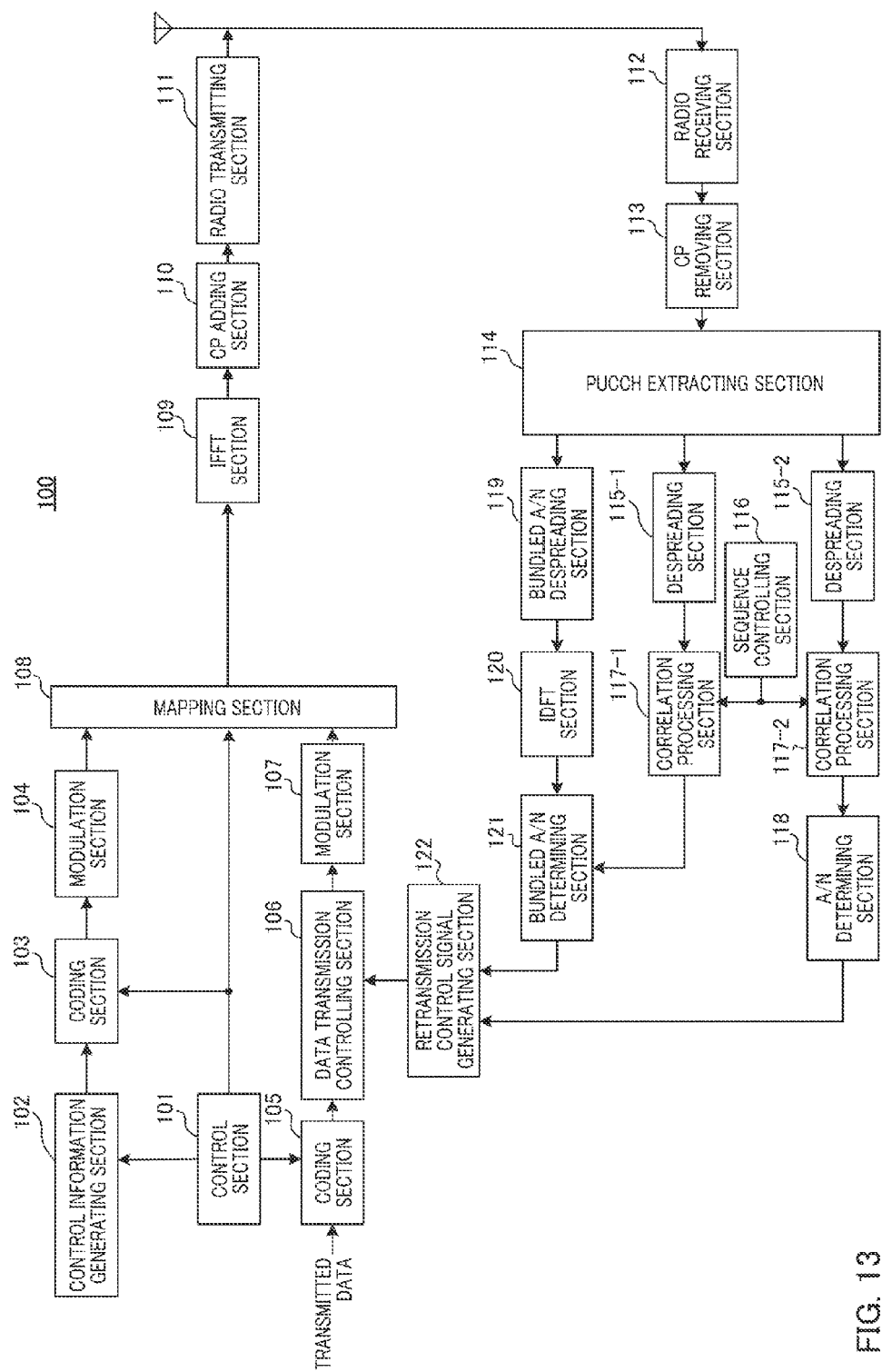
FIG. 13 is a block diagram illustrating a configuration of the base station according to the embodiment of the present invention.

FIG. 13 is a configuration diagram of base station 100 according to Embodiment 1 of the present invention. In FIG. 13, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier in a component carrier group configured for resource assignment target terminal 200. In addition, the downlink control information assignment resource is selected from among the resources corresponding to downlink control channel (i.e., PUCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. To put it more specifically, the downlink control information assignment resources are each formed of one or a plurality of CCEs (or R-CCEs, and may be referred to as "CCE" simply, without any distinction between CCE and R-CCE).

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. Data transmission controlling section 106 keeps the coded transmission data for each destination terminal 200. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200. The bundled ACK/NACK resource herein refers to a resource used for transmission of the bundled ACK/NACK signals and adopting the DFT-S-OFDM format structure. To put it more specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. To put it more specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200. The PUCCH resource selected by PUCCH extracting section 114 will be described hereinafter in detail.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence controlling section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

To put it more specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determining section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information received from bundled A/N determining section 121 and the information received from A/N determining section 118 and generates retransmission control signals based on the result of determination. To put it more specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 14:
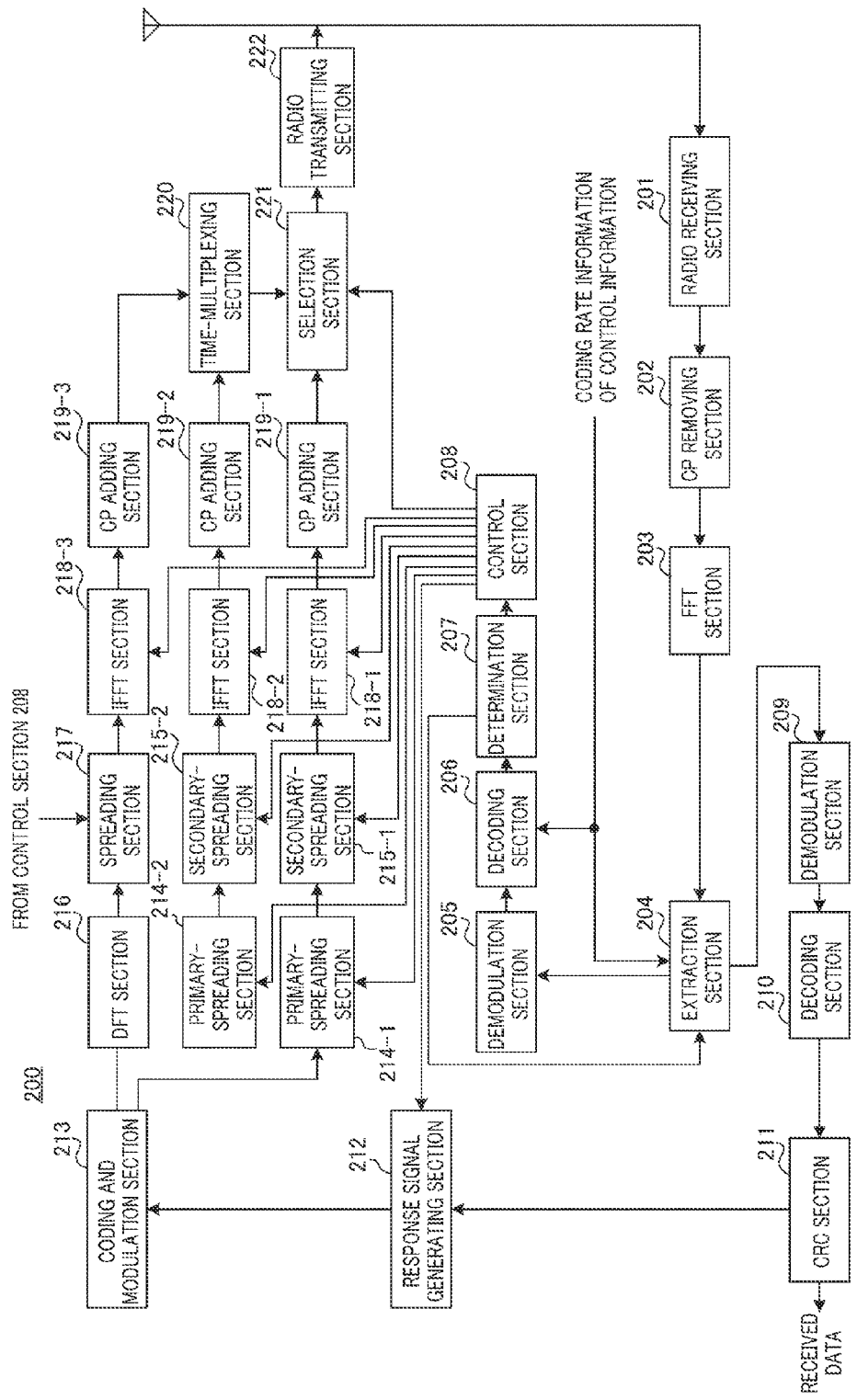
FIG. 14 is a block diagram illustrating a configuration of the terminal according to the embodiment of the present invention.

FIG. 14 is a block diagram illustrating a configuration of terminal 200 according to Embodiment 1. In FIG. 14, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. To put it more specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-spreading section 214-2 and outputs a Walsh sequence to secondary-spreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource. The method of notifying the A/N resource (i.e., PUCCH resource) in control section 208 will be described in detail, hereinafter.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception condition of downlink data (i.e., result of error detection on downlink data) on each downlink component carrier received from CRC section 211. To put it more specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

Primary-spreading sections 214-1 and 214-2 corresponding to the A/N resource and the reference signal resource of bundled ACK/NACK resource spread ACK/NACK signals or reference signals using a base sequence corresponding to the resource in accordance with an instruction from control section 208 and outputs the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

(Operations of Base Station 100 and Terminal 200)

A description will be provided regarding operations of base station 100 and terminal 200 each configured in the manner described above.

In the following description, terminal 200 is configured with two downlink component carriers (one PCell and one SCell) and one uplink component carrier. Furthermore, terminal 200 is configured with a transmission mode that supports up to 2 TBs (transmission mode 3, 4, or 8) for data assigned to at least PCell of the two downlink component carriers.

Figure 8:
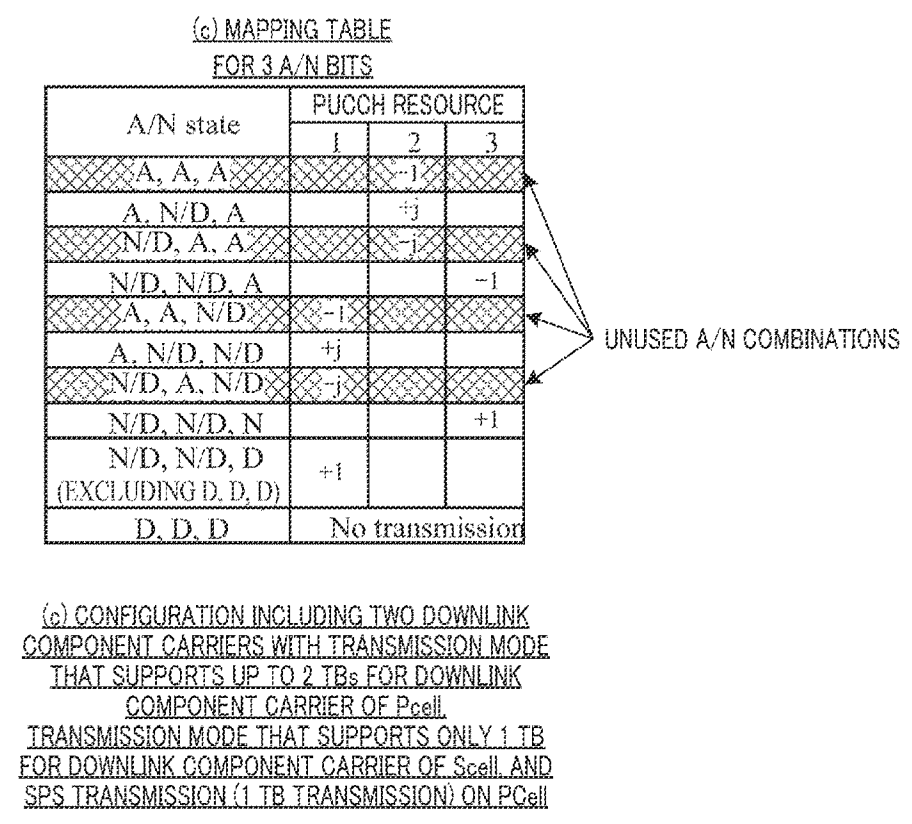
Figure 10:
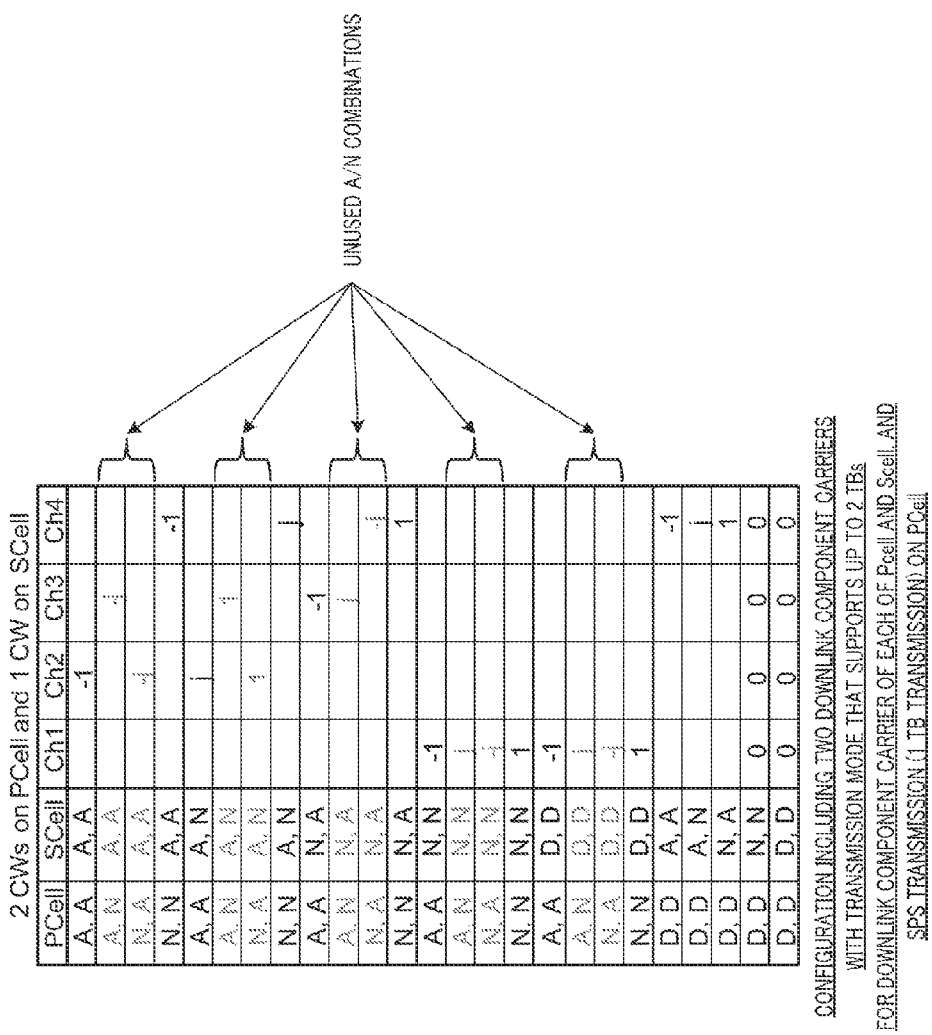
FIG. 10 is provided for describing a PUCCH resource indicating method (diagram 2)

Terminal 200 configured in the manner described above is further configured with a mapping table illustrated in FIG. 8 (in which a transmission mode that supports only 1 TB is set for SCell) or a mapping table illustrated in FIG. 10 (in which the transmission mode that supports up to 2 TBs is set for SCell). Resources for transmission of response signals including PUCCH resources 1 to 3 (in the case of FIG. 8) or PUCCH resources 1 to 4 are set in the mapping table (FIG. 8 or FIG. 10) for terminal 200 configured in the manner described above.

First, a PUCCH resource indicating method during dynamic scheduling in terminal 200 configured in the manner described above will be described in detail with reference to FIG. 15.

Figure 15:
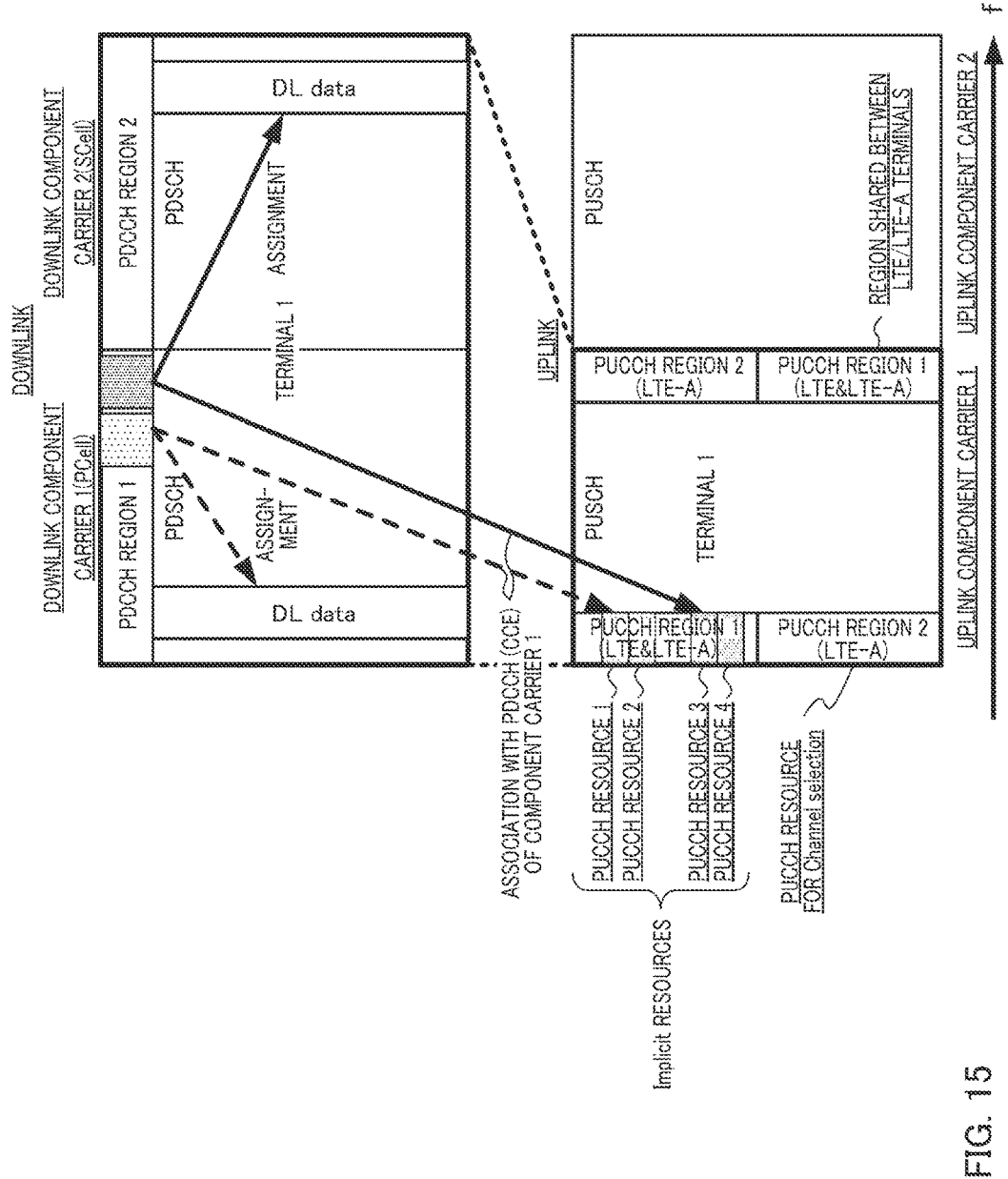
FIG. 15 illustrates a control example for PUCCH resources according to the embodiment of the present invention (example 1)

FIG. 15 illustrates an example of cross-carrier scheduling from PCell (downlink component carrier 1) to SCell (downlink component carrier 2). That is, in FIG. 15, a PDCCH in PCell indicates a PDSCH in SCell.

Terminal 200 (control section 208) transmits a response signal corresponding to downlink data through a PUCCH (PUCCH resource) of the uplink component carrier on the basis of a result of error detection obtained by CRC section 211 and a mapping table (transmission rule table) for the response signal.

For example, in FIG. 15, it is assumed that the top CCE index of the CCEs occupied by the PDCCH indicating the PDSCH in PCell is n_CCE. In this case, PUCCH resource 1 in the uplink component carrier is assigned in association in a one-to-one correspondence with the top CCE index (n_CCE) (implicit signaling). Furthermore, PUCCH resource 2 in the uplink component carrier is assigned in association in a one-to-one correspondence with the next index (n_CCE+1) of the top CCE index (n_CCE) of the CCEs occupied by the PDCCH indicating the PDSCH in PCell (implicit signaling).

Similarly, in FIG. 15, it is assumed that the top CCE index of the CCEs occupied by the PDCCH in PCell that indicates the PDSCH in SCell for which cross-carrier scheduling from PCell to SCell is configured is n_CCE' (n_CCE'≠n_CCE). In this case, PUCCH resource 3 in the uplink component carrier is assigned in association in a one-to-one correspondence with the top CCE index (n_CCE') (implicit signaling). Furthermore, for terminal 200 configured with a transmission mode that supports up to 2 TBs (transmission mode 3, 4, or 8) for data assigned to SCell, PUCCH resource 4 in the uplink component carrier is assigned in association in a one-to-one correspondence with the next index (n_CCE'+1) of the top CCE index (n_CCE') of the CCEs occupied by the PDCCH indicating the PDSCH in SCell (implicit signaling).

During dynamic scheduling, similarly to terminal 200, base station 100 (PUCCH extracting section 114) selects a recourse used for response signal transmission, from among the PUCCH resources associated with the CCEs occupied by the PDCCH indicated to terminal 200.

Note that the resource indicating method described above is an example in which all the PUCCH resources are implicitly signaled, but the present invention is not limited to this example. For example, all the PUCCH resources may be explicitly signaled. Alternatively, some of the PUCCH resources (for example, PUCCH resource 1 as well as PUCCH resource 3 during cross-carrier scheduling, which are illustrated in FIG. 15) may be implicitly signaled, and the other PUCCH resources (for example, PUCCH resource 2 and PUCCH resource 4 as well as PUCCH resource 3 during non-cross-carrier scheduling) may be explicitly signaled.

Hereinabove, the PUCCH resource indicating method used during dynamic scheduling has been described.

Next, a PUCCH resource indicating method used during semi-persistent scheduling (SPS) in terminal 200 configured as described above will be described in detail with reference to FIG. 16, FIG. 17, and FIG. 18.

Figure 16:
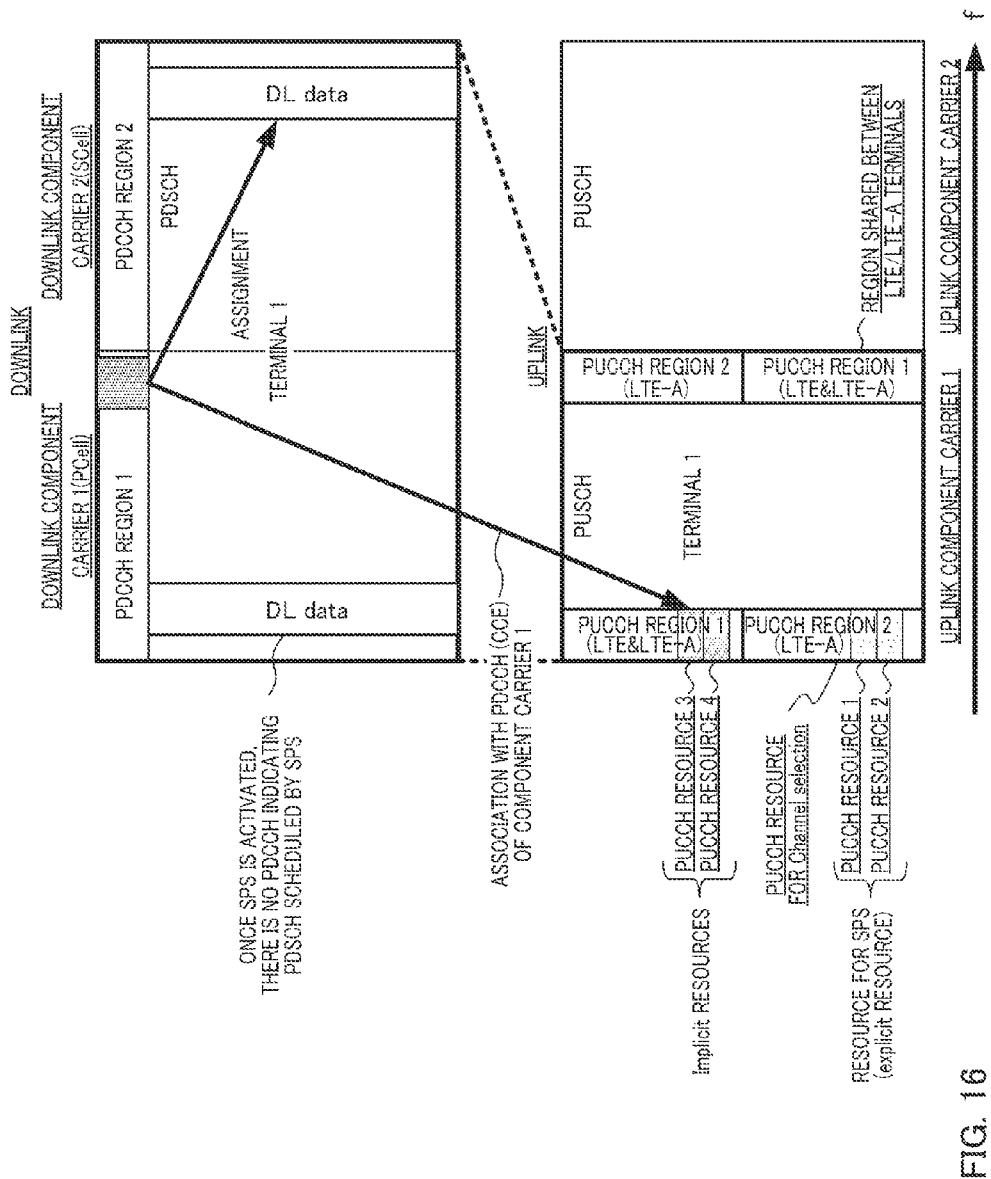
FIG. 16 illustrates a control example for PUCCH resources according to the embodiment of the present invention (example 2)

FIG. 16 illustrates an example in which cross-carrier scheduling is configured from PCell (downlink component carrier 1) to SCell (downlink component carrier 2). That is, in FIG. 16, PDCCH in PCell indicates PDSCH in SCell.

Terminal 200 (control section 208) transmits a response signal corresponding to downlink data through a PUCCH (PUCCH resource) of the uplink component carrier on the basis of a result of error detection obtained by CRC section 211 and a mapping table (transmission rule table) for the response signal.

Once SPS is activated, there is no PDCCH indicating a PDSCH for SPS in PCell. For this reason, once SPS activation is activated, PUCCH resource 1 and PUCCH resource 2 (implicit resources; see, for example, FIG. 15) in the uplink component carrier, which are associated in a one-to-one correspondence with the CCE indexes (for example, n_CCE and n_CCE+1), cannot be assigned for terminal 200.

Accordingly, during SPS, terminal 200 (control section 208) first selects, as PUCCH resource 1, a resource corresponding to the PUCCH resource index in association in a one-to-one correspondence with the transmission power control information (TPC command for PUCCH) included in the downlink assignment control information indicating the activation of SPS, from among the PUCCH resource indexes indicating the PUCCH resources included in the PUCCH.

FIG. 17 illustrates a correspondence between the transmission power control information (TPC command for PUCCH) included in PDCCH on which the SPS activation is indicated to terminal 200 and four PUCCH resource indexes ($n^{(1)}_{PUCCH}$) set in advance by base station 100. That is, each value ('00' to '11') of the TPC command for PUCCH is used as an index indicating any of values of the four PUCCH resources (first to fourth PUCCH resource indexes) set in advance by base station 100. Note that FIG. 17 is the same as a correspondence illustrated in an upper portion of FIG. 9, that is, a correspondence used in LTE (Release 8).

For example, with regard to PUCCH resource 1, terminal 200 selects one PUCCH resource index from among the four PUCCH resource indexes ($n^{(1)}_{PUCCH}$) on the basis of the value of the TPC command for PUCCH (the transmission power control information included in PDCCH on which the SPS activation is indicated) illustrated in FIG. 17. Then, a resource corresponding to the selected PUCCH resource index is assigned as PUCCH resource 1 in the uplink component carrier.

Subsequently, with regard to PUCCH resource 2, terminal 200 selects one PUCCH resource on the basis of a correspondence (illustrated in FIG. 18) between the values of the TPC command for PUCCH and the four PUCCH resource indexes. In FIG. 18, the values of the TPC command for PUCCH are respectively associated with values ($n^{(1)}_{PUCCH}$+1) obtained by adding 1 to the four PUCCH resource indexes ($n^{(1)}_{PUCCH}$) illustrated in FIG. 17. Then, a resource corresponding to the selected PUCCH resource index is assigned as PUCCH resource 2 in the uplink component carrier.

That is, terminal 200 (control section 208) selects PUCCH resource 2 on the basis of the PUCCH resource index of PUCCH resource 1 selected with reference to FIG. 17. Specifically, as illustrated in FIG. 18, terminal 200 selects, as PUCCH resource 2, a resource corresponding to a value (PUCCH resource index) obtained by adding 1 to the PUCCH resource index of PUCCH resource 1.

For example, a description will be given regarding the case where the TPC command for PUCCH included in the PDCCH that is indicated to terminal 200 for activation of SPS is '01.' In this case, with reference to FIG. 17, terminal 200 selects, as PUCCH resource 1, a resource (second PUCCH resource index) corresponding to the TPC command for PUCCH '01' from among the four PUCCH resource indexes ($n^{(1)}_{PUCCH}$). With reference to FIG. 18, terminal 200 further selects, as PUCCH resource 2, a resource (a value obtained by adding 1 to the second PUCCH resource index) corresponding to the TPC command for PUCCH '01' from among the four PUCCH resource indexes ($n^{(1)}_{PUCCH}$+1). The same applies to the case where the TPC command for PUCCH included in the PDCCH indicated to terminal 200 is other than '01' ('00,' '10,' '11').

Meanwhile, in FIG. 16, it is assumed that the top CCE index of the CCEs occupied by the PDCCH in PCell that indicates the PDSCH in SCell configured with cross-carrier scheduling from PCell to SCell is n_CCE' (n_CCE'≠n_CCE) similarly to FIG. 15.

In this case, similarly to FIG. 15 (during dynamic scheduling), PUCCH resource 3 in the uplink component carrier is assigned in association in a one-to-one correspondence with the top CCE index (n_CCE') (implicit signaling). When terminal 200 is configured with a transmission mode that supports up to 2 TBs (transmission mode 3, 4, or 8) for SCell, PUCCH resource 4 in the uplink component carrier is further assigned in association in a one-to-one correspondence with the next index (n_CCE'+1) of the top CCE index (n_CCE') of the CCEs occupied by the PDCCH indicating the PDSCH in SCell (implicit signaling).

During SPS, base station 100 (PUCCH extracting section 114) selects a recourse used for response signal transmission, from among specific PUCCH resources indicated in advance to terminal 200 or the PUCCH resources associated with the CCEs occupied by the PDCCH indicated to terminal 200. On this occasion, for terminal 200 configured with a transmission mode that supports up to 2 TBs for at least PCell, base station 100 selects the second resource for SPS on the basis of the PUCCH resource index used for selection of the first resource for SPS (the PUCCH resource index associated with the TPC command for PUCCH).

Hereinabove, the PUCCH resource indicating method used during SPS has been described.

In this way, during dynamic scheduling or semi-persistent scheduling (SPS), terminal 200 selects a resource used for response signal transmission, from among the PUCCH resources associated with the CCEs occupied by the PDCCH indicated to terminal 200 or specific PUCCH resources indicated in advance by base station 100 and controls the response signal transmission.

For example, when terminal 200 is configured with a transmission mode that supports up to 2 TBs for PCell, during dynamic scheduling, terminal 200 transmits the response signal using: a PUCCH resource (implicit resource) associated with the top CCE index of the CCEs occupied by the PDCCH indicating each of the PDSCH in PCell and PDSCH in SCell; and a PUCCH resource (implicit resource) associated with the next CCE index of the top CCE index. Specifically, during dynamic scheduling, a value associated with the top CCE index (n_CCE) of the CCEs used for PDCCH transmission is used as the PUCCH resource index (the value of $n^{(1)}_{PUCCH}$) (see, for example, FIG. 15). Furthermore, when a transmission mode that supports up to 2 TBs is set for PCell, a value associated with n_CCE+1 is used as the PUCCH resource index.

Meanwhile, during SPS in PCell, terminal 200 uses, for PCell: a PUCCH resource (explicit resource) that is associated in a one-to-one correspondence with the (two-bit) value of the TPC command for PUCCH indicated when SPS is activated; and a resource (obtained by adding 1 to the index) adjacent to the PUCCH resource (explicit resource).

That is, terminal 200 selects the second resource for SPS on the basis of the first resource for SPS selected in accordance with the TPC command for PUCCH. Specifically, terminal 200 selects the second resource for SPS ($n^{(1)}_{PUCCH}+1$) using the PUCCH resource index ($n^{(1)}_{PUCCH}$) used for selection of the first resource for SPS. That is, during SPS, the PUCCH resource index (the value of $n^{(1)}_{PUCCH}$) is determined in accordance with settings made by base station 100 (see, for example, FIG. 17). Furthermore, when a transmission mode that supports up to 2 TBs is set for PCell, the PUCCH resource index is given as $n^{(1)}_{PUCCH}+1$.

As a result, when configured with a transmission mode that supports up to 2 TBs (that is, 2 code words) (for example, MIMO transmission mode) for data assigned to at least PCell, even during SPS, terminal 200 can identify all PUCCH resources used for response signal transmission. In other words, it is possible for terminal 200 to prevent a problem in that PUCCH resources cannot be identified because no PDCCH is transmitted during SPS (occurrence of a lack of PUCCH resources).

In FIG. 17, the number of the PUCCH resource indexes associated with the TPC command for PUCCH included in the PDCCH on which the SPS activation is indicated, as PUCCH resource 1 (first PUCCH resource) used as a resource for SPS (explicit resource) is four (the same number as that of LTE) set in advance by base station 100. Furthermore, as illustrated in FIG. 18, PUCCH resource indexes that are set as PUCCH resource 2 (second PUCCH resource) used as a resource for SPS are indexes obtained by adding 1 to the PUCCH resource indexes associated with the TPC command for PUCCH. Accordingly, compared with the method illustrated in FIG. 9, in which new PUCCH resource indexes (fifth to eighth PUCCH resource indexes in FIG. 9) are set in advance, the present embodiment can reduce the amount of signaling from base station 100 to terminal 200. In other words, in the present embodiment, the amount of signaling required to indicate the resources for SPS is the same as that of LTE (Release 8).

As described above, during dynamic scheduling, terminal 200 uses PUCCH resources (implicit resources) respectively corresponding to the top CCE index (n_CCE) of the CCEs occupied by the PDCCH and the next CCE index (n_CCE+1) of the top CCE index. Meanwhile, during SPS, terminal 200 uses: the PUCCH resource index ($n^{(1)}_{PUCCH}$) associated with the TPC command for PUCCH included in the PDCCH on which the SPS activation is indicated; and the PUCCH resource index ($n^{(1)}_{PUCCH}+1$) obtained by adding 1 to the PUCCH resource index ($n^{(1)}_{PUCCH}$). That is, for both dynamic scheduling and SPS, terminal 200 uses a specific index (n_CCE or $n^{(1)}_{PUCCH}$) and an index (n_CCE+1 or $n^{(1)}_{PUCCH}+1$) obtained by adding 1 to the specific index. That is, terminal 200 can adopt a PUCCH resource selecting method common to both dynamic scheduling and SPS. Accordingly, the process of selecting a PUCCH resource by terminal 200 can be simplified.

In this way, according to the present embodiment, the amount of signaling from a base station can be reduced while a lack of PUCCH resources can be resolved during semi-persistent scheduling on PCell when a terminal is configured with a transmission mode that supports up to 2 TBs for PCell, while ARQ is applied to communications using an uplink component carrier and a plurality of downlink component carriers associated with the uplink component carrier.

Note that, with regard to the method of indicating PUCCH resource 2 used as a resource for SPS, the value to be added to the index of PUCCH resource 1 used as a resource for SPS is not limited to 1 and may be a value of 1 or more (that is, natural number n). Furthermore, the value to be added (natural number n) may be set in advance by base station 100. Furthermore, when the maximum value of a PUCCH resource index is defined, the remainder of the value divided by the maximum value after adding 1 to the value may be used.

In the present embodiment, a description has been given of the case where a value ($n^{(1)}_{PUCCH}+1$) obtained by adding 1 to the PUCCH resource index ($n^{(1)}_{PUCCH}$) associated with the TPC command for PUCCH is defined as the PUCCH resource index of PUCCH resource 2. Stated differently, in the present embodiment, a description has been given of the case where terminal 200 selects the PUCCH resource index of second PUCCH resource 2 on the basis of the PUCCH resource index of first PUCCH resource 1. Alternatively, terminal 200 may select the PUCCH resource index of second PUCCH resource 2 on the basis of the transmission power control information (TPC command for PUCCH) used for identifying first PUCCH resource 1. That is, terminal 200 obtains second transmission power control information on the basis of first transmission power control information (information indicated through PDCCH when SPS is activated). For example, terminal 200 adds 1 to the first transmission power control information and uses the remainder of the value divided by 4 after adding 1 to the value, as the second transmission power control information. Terminal 200 selects a resource corresponding to the second PUCCH resource index associated in a one-to-one correspondence with the second transmission power control information, as the second PUCCH resource (that is, second PUCCH resource 2).

For example, a description will be given regarding a case where the TPC command for PUCCH is '00.' In this case, as illustrated in FIG. 17, the PUCCH resource index associated in a one-to-one correspondence with the first transmission power control information is "FIRST PUCCH RESOURCE INDEX." Subsequently, the value '01' obtained by adding 1 to the first transmission power control information '00' is defined as the second transmission power control information. Accordingly, terminal 200 identifies the PUCCH resource index associated in a one-to-one correspondence with the second transmission power control information '01' as "SECOND PUCCH RESOURCE INDEX" with reference to FIG. 17. Consequently, in the case where the TPC command for PUCCH is '00,' "FIRST PUCCH RESOURCE INDEX" is selected as PUCCH resource 1, and "SECOND PUCCH RESOURCE INDEX" is selected as PUCCH resource 2. The same applies to the case where the TPC command for PUCCH is other than '00' ('01', '10', '11'). FIG. 19 illustrates a correspondence between the TPC command for PUCCH (that is, the first transmission power control information) and the PUCCH resource index of second PUCCH resource 2. Specifically, terminal 200 selects first PUCCH resource 1 with reference to FIG. 17 and selects second PUCCH resource 2 with reference to FIG. 19.

The value to be added is not limited to 1 and may be 2 or 3. That is, the value to be added may be natural number m not greater than three. More specifically, terminal 200 may add natural number m to the value of the first transmission power control information (TPC command for PUCCH) included in the PDCCH on which the SPS activation is indicated. Then, terminal 200 may define, as the second transmission power control information, the remainder of the value dividing by 4 (the number of types of the TPC command for PUCCH) after adding m to (that is, the remainder of the value divided by 4 after adding m to the value; mod ((TPC command for PUCCH+1), 4)). Terminal 200 may define, as the second PUCCH resource, a resource corresponding to the PUCCH resource index associated in a one-to-one correspondence with the second transmission power control information. Meanwhile, the value to be added (natural number m) may be set in advance by base station 100.

During dynamic scheduling, a PUCCH resource (PUCCH resource 1 or 3 (implicit resource) in the case of the present embodiment in which a transmission mode that supports up to 2 TBs is set for data assigned to PCell) in the uplink component carrier, associated in a one-to-one correspondence with the top CCE index of the CCEs occupied by the PDCCH indicating the PDSCH in a certain component carrier (any of PCell and SCell) may be expressed as $n^{(1)}_{PUCCH,i}$ (i=0 or i=2, when a transmission mode that supports up to 2 TBs is set for the data assigned to PCell). Furthermore, in terminal 200 configured with a transmission mode that supports up to 2 TBs for the data assigned to the certain component carrier, a PUCCH resource (PUCCH resource 2 or 4 in the case of the present embodiment) in the uplink component carrier, associated in a one-to-one correspondence with the next index of the top CCE index of the CCEs occupied by the PDCCH indicating the PDSCH in the certain component carrier may be expressed as $n^{(1)}_{PUCCH,i+1}$ (i+1=1 or i+1=3 when a transmission mode that supports up to 2 TBs is set for the data assigned to PCell). Note that subscript x (i or i+1 in the above) added to $n^{(1)}_{PUCCH,x}$ indicates an index value of each PUCCH resource, and takes a value of 0≤x≤A−1. "A" in the expression indicates the sum of the maximum numbers of TBs that can be supported in PCell and SCell and is a value equal to the number of PUCCH resources.

Similarly, during SPS in PCell, the first resource for SPS (PUCCH resource 1 (explicit resource) in the case of the present embodiment in which a transmission mode that supports up to 2 TBs is set for data assigned to PCell) may be expressed as $n^{(1)}_{PUCCH,i}$ (i=0, when a transmission mode that supports up to 2 TBs is set for the data assigned to PCell). Furthermore, in terminal 200 configured with a transmission mode that supports up to 2 TBs for the data assigned to PCell, the second resource for SPS (PUCCH resource 2 in the case of the present embodiment) may be expressed as $n^{(1)}_{PUCCH,i+1}$ (i+1=1 when a transmission mode that supports up to 2 TBs is set for the data assigned to PCell).

Meanwhile, during dynamic scheduling, for example, the PUCCH resource index ($n^{(1)}_{PUCCH,i}$) associated in a one-to-one correspondence with the top CCE index (n_CCE) may be expressed as $n\_CCE+N^{(1)}_{PUCCH}$. $N^{(1)}_{PUCCH}$ indicates a resource (index) set in advance by base station 100. Similarly, the PUCCH resource ($n^{(1)}_{PUCCH,i+1}$) associated in a one-to-one correspondence with the CCE index (n_CCE+1) may be expressed as $n\_CCE+1+N^{(1)}_{PUCCH}$.

The expression "during SPS in PCell" can also be expressed as, for example, "during PDSCH transmission in PCell without a corresponding PDCCH." Furthermore, the expression "during dynamic scheduling" can also be expressed as, for example, "during PDSCH transmission with a corresponding PDCCH."

Embodiment 2

Hereinafter, a description will be given in detail with reference to FIG. 15, regarding a PUCCH resource indicating method during dynamic scheduling when the terminal is configured with 2 CCs and the transmission mode that supports up to 2 TBs (transmission mode 3, 4, or 8) for at least PCell. FIG. 15 illustrates an example of cross-carrier scheduling from PCell to SCell, however. More specifically, the PDCCH in PCell indicates the PDSCH in SCell.

PUCCH resource 1 in an uplink component carrier is assigned in association in a one-to-one correspondence with the top CCE index (n_CCE) of the CCEs occupied by the PDCCH indicating the PDSCH in PCell (implicit signaling). Moreover, PUCCH resource 2 in the uplink component carrier is assigned in association in a one-to-one correspondence with the index subsequent to the top CCE index (n_CCE+1) of the CCEs occupied by the PDCCH indicating the PDSCH in PCell (implicit signaling).

PUCCH resource 3 in the uplink component carrier is assigned in association in a one-to-one correspondence with the top CCE index (n_CCE' (n_CCE'≠n_CCE)) of the CCEs occupied by the PDCCH in PCell that indicates the PDSCH in SCell. PUCCH resource 3 is cross-carrier scheduled from PCell to SCell. Furthermore, when the terminal is configured with a transmission mode that supports up to 2 TBs (transmission mode 3, 4, or 8) for SCell, PUCCH resource 4 in the uplink component carrier is assigned in association in a one-to-one correspondence with the next index (n_CCE'+1) of the top CCE index of the CCEs occupied by the PDCCH indicating the PDSCH in PCell (implicit signaling).

Note that the resource indicating method described above is an example in which all the PUCCH resources are implicitly signaled, but the present invention is not limited to this example. All the PUCCH resources may be explicitly signaled. Alternatively, some of the PUCCH resources (for example, PUCCH resource 1 as well as PUCCH resource 3 at the time of cross-carrier scheduling) may be implicitly signaled, and the other PUCCH resources (for example, PUCCH resource 2 and PUCCH resource 4 as well as PUCCH resource 3 at the time of non-cross-carrier scheduling) may be explicitly signaled.

Next, a PUCCH resource indicating method during semi-persistent scheduling (SPS) when the terminal is configured with 2 CCs and the transmission mode that supports up to 2 TBs (transmission mode 3, 4, or 8) for at least PCell will be described in detail with reference to FIG. 16, FIG. 17, and FIG. 18. FIGS. 16, 17 and 18 illustrate an example of cross-carrier scheduling from PCell to SCell, however. More specifically, the PDCCH in PCell indicates the PDSCH in SCell.

Once SPS is activated, there is no PDCCH indicating a PDSCH for SPS in PCell, and hence PUCCH resource 1 and PUCCH resource 2 in the uplink component carrier, which are associated in a one-to-one correspondence with CCE indexes, cannot be assigned. Accordingly, with regard to PUCCH resource 1, as illustrated in FIG. 17, one PUCCH resource index is selected from among the four PUCCH resource indexes ($n^{(1)}_{PUCCH}$) set in advance by the base station, on the basis of the value of the transmission power control information (TPC command for PUCCH) in the PDCCH on which the SPS activation is indicated. PUCCH resource 1 in the uplink component carrier is assigned in accordance with the selected PUCCH resource index.

With regard to PUCCH resource 2, as illustrated in FIG. 18, one PUCCH resource index is selected from among values ($n^{(1)}_{PUCCH}+1$) obtained by adding 1 to the four PUCCH resource indexes ($n^{(1)}_{PUCCH}$) that are set in advance for PUCCH resource 1 by the base station, on the basis of the value of the transmission power control information (TPC command for PUCCH) in the PDCCH in which the SPS activation is indicated. PUCCH resource 2 in the uplink component carrier is assigned in accordance with the selected PUCCH resource index. Note that, with regard to the method of indicating PUCCH resource 2, the value to be added is not limited to 1 and may be a value of 1 or more. Furthermore, the added value may be set in advance by the base station. Furthermore, when the maximum value of a PUCCH resource index is defined, the remainder of the value divided by the maximum value after adding 1 to the value may be used.

In the embodiment described above, PUCCH resource 1 (that is, the first PUCCH resource) is selected on the basis of the four PUCCH resource indexes ($n^{(1)}_{PUCCH}$) (that is, the first PUCCH resource index) that are set in advance for PUCCH resource 1 by the base station on the basis of the value of the transmission power control information (TPC command for PUCCH) (that is, the first transmission power control information) in the PDCCH on which the SPS activation is indicated. In addition, the second PUCCH resource index can be obtained on the basis of the first PUCCH resource index. PUCCH resource 2 (that is, the second PUCCH resource) is selected in accordance with the second PUCCH resource index.

Note that, in the embodiment described above, the PUCCH resource index of PUCCH resource 2 is selected on the basis of values obtained by adding 1 to the four PUCCH resource indexes ($n^{(1)}_{PUCCH}$). Alternatively, as illustrated in FIG. 19, the PUCCH resource index of PUCCH resource 2 may be selected on the basis of the remainder (that is, mod (TPC command for PUCCH+1, 4)) obtained by: adding 1 to the value of the transmission power control information (TPC command for PUCCH) in the PDCCH in which the SPS activation is indicated; and dividing the resultant value by 4. In this case, the added value is not limited to 1, and may be 2 or 3. Furthermore, the value to be added may be set in advance by the base station. In this case, the second transmission power control information is obtained on the basis of the first transmission power control information. The second PUCCH resource index and the second PUCCH resource are selected on the basis of the second transmission power control information.

The description regarding PUCCH resource 3 and PUCCH resource 4 is the same as the description of dynamic scheduling in FIG. 15 and thus is omitted.

In this way, during dynamic scheduling or semi-persistent scheduling (SPS), terminal 200 selects a resource used for response signal transmission from among the PUCCH resources associated with the CCEs and specific PUCCH resources indicated in advance by base station 100, and controls the response signal transmission. Consequently, when configured with a transmission mode that supports up to 2 TBs for at least PCell by base station 100, terminal 200 can solve a problem of a lack of PUCCH resources, which occurs during semi-persistent scheduling (SPS). Furthermore, compared with a method in which new four PUCCH resource indexes (the fifth to eighth PUCCH resource indexes) are independently set in advance in addition to the first to fourth PUCCH resource indexes, according to the present invention, PUCCH resource 2 (second PUCCH resource) is selected on the basis of PUCCH resource 1 (first PUCCH resource) (more specifically, on the basis of: the PUCCH resource index of PUCCH resource 1 (first PUCCH resource index); or the transmission power control information (TPC command for PUCCH) (first transmission power control information) in the PDCCH in which the SPS activation is indicated). Accordingly, setting the first to fourth PUCCH resource indexes only in advance is sufficient, so that the amount of signaling from the base station can be reduced.

During dynamic scheduling or semi-persistent scheduling (SPS), base station 100 selects a resource used for response signal transmission, from among the PUCCH resources associated with the CCEs and specific PUCCH resources indicated in advance to terminal 200. In addition, when a transmission mode that supports up to 2 TBs is set for at least PCell by base station 100, during semi-persistent scheduling (SPS), base station 100 selects the second PUCCH resource for SPS using the transmission power control information (the value of the TPC command for PUCCH) or the PUCCH resource index, which is used to select the first PUCCH resource for SPS.

In this way, according to the present embodiment, the amount of signaling from a base station can be reduced while a lack of PUCCH resources can be resolved during semi-persistent scheduling in PCell when a terminal is configured with a transmission mode that supports up to 2 TBs for PCell, while ARQ is applied to communications using an uplink component carrier and a plurality of downlink component carriers associated with the uplink component carrier.

Embodiments of the present invention have been described above.

In the above described embodiments, ZAC sequences, Walsh sequences, and DFT sequences are described as examples of the sequences used for spreading. However, instead of ZAC sequences, sequences that can be separated using different cyclic shift values, other than ZAC sequences may be used. For example, the following sequences may be used for primary-spreading: generalized chirp like (GCL) sequences; constant amplitude zero auto correlation (CA-ZAC) sequences; zadoff-chu (ZC) sequences; PN sequences such as M sequences or orthogonal Gold code sequences; or sequences having a steep autocorrelation characteristic on the time axis randomly generated by computer. In addition, instead of Walsh sequences and DFT sequences, any sequences may be used as orthogonal code sequences as long as the sequences are mutually orthogonal or considered to be substantially orthogonal to each other. In the abovementioned description, the resource of response signals (e.g., A/N resource and bundled ACK/NACK resource) is defined by the frequency position, cyclic shift value of the ZAC sequence and sequence number of the orthogonal code sequence.

Moreover, control section 101 of base station 100 is configured to control mapping in such a way that downlink data and the downlink assignment control information for the downlink data are mapped to the same downlink component carrier in the embodiments described above, but is by no means limited to this configuration. To put it differently, even if downlink data and the downlink assignment control information for the downlink data are mapped to different downlink component carriers, the technique described in each of the embodiments can be applied as long as the correspondence between the downlink assignment control information and the downlink data is clear.

Furthermore, as the processing sequence in terminals, the case where IFFT transform is performed after the primary-spreading and secondary-spreading has been described. However, the processing sequence in terminals is by no means limited to this sequence. As long as IFFT processing is performed after the primary-spreading processing, an equivalent result can be obtained regardless of the position of the secondary-spreading processing.

In each of the embodiments, the description has been provided with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, 3GPP LTE does not specify the number of physical antennas forming an antenna port, but specifies an antenna port as a minimum unit allowing base stations to transmit different reference signals.

In addition, an antenna port may be specified as a minimum unit to be multiplied by a precoding vector weighting.

The above-noted embodiments have been described by examples of hardware implementations, but the present invention can be also implemented by software in conjunction with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of the specifications, drawings, and abstracts included in Japanese Patent Application No. 2011-000744 filed on Jan. 5, 2011 and Japanese Patent Application No. 2011-233007 filed on Oct. 24, 2011 are incorporated herein by reference in their entirety.

INDUSTRIAL APPLICABILITY

The present invention can be applied to mobile communication systems and/or the like.

REFERENCE SIGNS LIST

100 Base station
101, 208 Control section
102 Control information generating section
103, 105 Coding section
104, 107 Modulation section
106 Data transmission controlling section
108 Mapping section
109, 218-1, 218-2, 218-3 IFFT section
110, 219-1, 219-2, 219-3 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section 200 Terminal
203 FFT section
204 Extraction section
205, 209 Demodulation section
206, 210 Decoding section
207 Determination section
211 CRC section
212 Response signal generating section
213 Coding and modulation section
214-1, 214-2 Primary-spreading section
215-1, 215-2 Secondary-spreading section
216 DFT section
217 Spreading section
220 Time-multiplexing section
221 Selection section

The invention claimed is:

1. An integrated circuit comprising:
transmission circuitry which, in operation, transmits downlink data to a communication partner apparatus on a first component carrier, for which a transmission mode is set to support up to two transport blocks;
reception circuitry which, in operation, receives from the communication partner apparatus a response signal indicative of a plurality of error detection results of the downlink data, wherein, when a semi-persistent scheduling (SPS) is activated for the first component carrier to periodically assign resources, the response signal is mapped to either one of a first physical uplink control channel (PUCCH) resource and a second PUCCH resource respectively indicated by a first PUCCH resource index and a second PUCCH resource index, the first PUCCH resource index is a PUCCH resource index which is selected from a plurality of PUCCH resource indices and which corresponds to a value of a transmission power control (TPC) command for an uplink control channel, and the second PUCCH resource index is another PUCCH resource index which is selected from the plurality of PUCCH resource indices and which corresponds to a value generated by adding 1 to the first PUCCH resource index; and
control circuitry which, in operation, determines necessity of retransmission of the downlink data based on the received response signal and instructs the transmission circuitry to retransmit the downlink data.

2. The integrated circuit according to claim 1, wherein:
the plurality of PUCCH resource indices includes four PUCCH resource indices 1-4 and the TPC command is indicated by two bits;
when the value of the TPC command is 00, the first PUCCH resource index indicates PUCCH resource 1;
when the value of the TPC command is 01, the first PUCCH resource index indicates PUCCH resource 2;
when the value of the TPC command is 10, the first PUCCH resource index indicates PUCCH resource 3; and
when the value of the TPC command is 11, the first PUCCH resource index indicates PUCCH resource 4.

3. The integrated circuit according to claim 1, wherein:
the first component carrier is a primary cell (PCell) which is paired with an uplink component carrier used to receive the response signal; and
the transmitting circuitry transmits, in addition to the downlink data on the first component carrier, downlink data on a second component carrier which is a secondary cell (SCell) different from the primary cell.

4. The integrated circuit according to claim 1, wherein:
the plurality of error detection results are a combination of an acknowledgement (ACK) indicating that an error was not detected, a negative-acknowledgement (NACK) indicating that an error was detected, and a discontinuous transmission (DTX) indicating that reception of a downlink control signal has failed.

5. The integrated circuit according to claim 1, wherein:
the TPC command is included in downlink control information which indicates activation of the SPS.

6. An integrated circuit to control a process comprising:
transmitting downlink data to a communication partner apparatus on a first component carrier, for which a transmission mode is set to support up to two transport blocks;
receiving from the communication partner apparatus a response signal indicative of a plurality of error detection results of the downlink data, wherein, when a semi-persistent scheduling (SPS) is activated for the first component carrier to periodically assign resources, the response signal is mapped to either one of a first physical uplink control channel (PUCCH) resource and a second PUCCH resource respectively indicated by a first PUCCH resource index and a second PUCCH resource index, the first PUCCH resource index is a PUCCH resource index which is selected from a plurality of PUCCH resource indices and which corresponds to a value of a transmission power control command (TPC command) for an uplink control channel, and the second PUCCH resource index is a another PUCCH resource index which is selected from the plurality of PUCCH resource indices and which corresponds to a value generated by adding 1 to the first PUCCH resource index; and
determining necessity of retransmission of the downlink data based on the received response signal and retransmitting the downlink data.

7. The integrated circuit according to claim 6, wherein:
the plurality of PUCCH resource indices includes four PUCCH resource indices 1-4 and the TPC command is indicated by two bits;
when the value of the TPC command is 00, the first PUCCH resource index indicates PUCCH resource 1;
when the value of the TPC command is 01, the first PUCCH resource index indicates PUCCH resource 2;
when the value of the TPC command is 10, the first PUCCH resource index indicates PUCCH resource 3; and
when the value of the TPC command is 11, the first PUCCH resource index indicates PUCCH resource 4.

8. The integrated circuit according to claim 6, wherein:
the first component carrier is a primary cell (PCell) which is paired with an uplink component carrier used to receive the response signal; and
the process further comprises transmitting, in addition to the downlink data on the first component carrier, downlink data on a second component carrier which is a secondary cell (SCell) different from the primary cell.

9. The integrated circuit according to claim 6, wherein:
the plurality of error detection results are a combination of an acknowledgement (ACK) indicating that an error was not detected, a negative-acknowledgment (NACK) indicating that an error was detected, and a discontinuous transmission (DTX) indicating that reception of a downlink control signal has failed.

10. The integrated circuit according to claim 6, wherein:
the TPC command is included in downlink control information which indicates activation of the SPS.

11. The integrated circuit according to claim 6, comprising:
circuitry configured to control the process;
an input configured to receive data for the process; and
an output configured to transmit data from the process.

* * * * *